US007657906B2

(12) United States Patent
Icho et al.

(10) Patent No.: US 7,657,906 B2
(45) Date of Patent: Feb. 2, 2010

(54) PROGRAM RECOMMENDATION APPARATUS, METHOD AND PROGRAM USED IN THE PROGRAM RECOMMENDATION APPARATUS

(75) Inventors: Keiji Icho, Osaka (JP); Hirokazu Tokuda, Osaka (JP); Yuko Tsusaka, Osaka (JP)

(73) Assignee: Panasonic Corporation, Osaka (JP)

( * ) Notice: Subject to any disclaimer, the term of this patent is extended or adjusted under 35 U.S.C. 154(b) by 447 days.

(21) Appl. No.: 10/578,433

(22) PCT Filed: Nov. 11, 2004

(86) PCT No.: PCT/JP2004/016739

§ 371 (c)(1),
(2), (4) Date: May 5, 2006

(87) PCT Pub. No.: WO2005/048587

PCT Pub. Date: May 26, 2005

(65) Prior Publication Data

US 2008/0295132 A1    Nov. 27, 2008

(30) Foreign Application Priority Data

Nov. 13, 2003    (JP)    ............... 2003-383976

(51) Int. Cl.
*H04N 7/01*    (2006.01)
*H04N 7/025*   (2006.01)
*H04N 5/445*   (2006.01)

(52) U.S. Cl. ........................................................ 725/45
(58) Field of Classification Search .................. 725/37, 725/39, 45, 46, 50, 53, 58; 702/179–182

See application file for complete search history.

(56) References Cited

U.S. PATENT DOCUMENTS 5,371,807 A  *  12/1994  Register et al. ............. 382/159

(Continued)

FOREIGN PATENT DOCUMENTS

JP    10-243309    9/1998

(Continued)

OTHER PUBLICATIONS

Supplementary European Search Report issued Oct. 29, 2008 in connection with EP 04 81 8495 corresponding to the present U.S. application.

(Continued)

*Primary Examiner*—Andrew Y Koenig
*Assistant Examiner*—Carmine Malangone
(74) *Attorney, Agent, or Firm*—Wenderoth, Lind & Ponack, L.L.P.

(57) ABSTRACT

A program recommendation apparatus that recommends a program to a user that is in accordance with the user's preference, by taking into account the importance of keywords used in classifying programs' contents into correct categories. The program recommendation apparatus has a category dictionary containing words as keywords, where each of the keywords is stored in association with contribution factors assigned with respect to categories respectively, searches program information of each program in an EPG for the keywords contained in the category dictionary, for any found keywords, obtains category summations of contribution factors of the found keywords for each of the categories, calculates category evaluation values of the program according to the category summations of the contribution factors, and recommends one or more programs to the user according to a degree of similarity between the category evaluation values of the programs and user preference factors.

3 Claims, 31 Drawing Sheets

U.S. PATENT DOCUMENTS

| | | | |
|---|---|---|---|
| 5,758,257 A * | 5/1998 | Herz et al. ................. 725/116 |
| 6,473,753 B1 | 10/2002 | Katariya et al. | |
| 6,785,671 B1 * | 8/2004 | Bailey et al. ................. 707/3 |
| 6,839,680 B1 * | 1/2005 | Liu et al. ................. 705/10 |
| 2001/0014868 A1 * | 8/2001 | Herz et al. ................. 705/14 |
| 2002/0022956 A1 | 2/2002 | Ukrainczyk et al. | |
| 2002/0087979 A1 * | 7/2002 | Dudkiewicz et al. ......... 725/34 |
| 2002/0152474 A1 | 10/2002 | Dudkiewicz | |
| 2002/0157096 A1 | 10/2002 | Hane et al. | |
| 2003/0225777 A1 * | 12/2003 | Marsh ................. 707/101 |
| 2005/0060743 A1 * | 3/2005 | Ohnuma et al. ............. 725/39 |

FOREIGN PATENT DOCUMENTS

| | | |
|---|---|---|
| JP | 11-007453 | 1/1999 |
| JP | 11-196389 | 7/1999 |
| JP | 2000-013708 | 1/2000 |
| JP | 2000-059745 | 2/2000 |
| JP | 2002-320159 | 10/2002 |
| JP | 2002-354356 | 12/2002 |
| JP | 2002-369090 | 12/2002 |

OTHER PUBLICATIONS

European Office Action issued Oct. 7, 2009 in European Patent Application No. 04818495.6.

Supplementary European Search Report issued Oct. 29, 2008 in connection with EP 04 81 8495 corresponding to the present U.S. application.

* cited by examiner

FIG. 2

| PROGRAM TITLE | BROADCAST DATE/TIME | BROADCAST STATION | CAST | PROGRAM DESCRIPTION | GENRE |
|---|---|---|---|---|---|
| DAY-TRIP TRAVELOGUE | 9/1 (MON) 10:00~11:00 | XYZ TELEVISION | | INTRODUCE NICE DAY-TRIP TRAVEL SPOT. DINNER AT HIGH-CLASS JAPANESE HOTEL. | TRAVEL |
| GOURMET GUIDE | 9/1 (MON) 14:00~15:00 | XYZ TELEVISION | MIZUNO HANAKO | DOWNTOWN LUNCH INFORMATION. FEATURING FRENCH CUISINE | COOKING |
| HIDDEN ONSEN TOUR | 9/1 (MON) 20:00~21:00 | MAIASA BROADCAST | | INTRODUCE UNKNOWN ONSENS IN JAPAN. ALSO INTRODUCE INEXPENSIVE HOTELS. ESPECIALLY FEATURING SO-AND-SO ONSEN | TRAVEL |
| TODAY'S LUNCH | 9/3 (WED) 10:00~10:30 | YOMIKAI BROADCAST | SHIMONUMA ETSUKO | INTRODUCE DISHES USING SEASONAL FOOD. TODAY'S MENU "GRILLED SAURY WITH SALT" | COOKING |
| ACCOMMODATIONS DIRECTORY | 9/7 (SUN) 15:00~15:15 | MAIASA BROADCAST | | PORGRAM INTRODUCING ACCOMMODATIONS ALL OVER JAPAN | TRAVEL |
| HOW TO WALK ABROAD | 9/8 (MON) 11:00~11:30 | XYZ TELEVISION | | INTRODUCE SIGHTSEEING SPOT AND ACCOMMODATIONS ABROAD. FEATURING "FRANCE" TODAY. | TRAVEL |

FIG. 3

| KEYWORD \ CATEGORY | TRAVEL | GOURMET | COOKING |
|---|---|---|---|
| ACCOMMODATIONS | 1.00 | 0.00 | 0.00 |
| JAPANESE HOTELS | 0.90 | 0.00 | 0.00 |
| SIGHTSEEING | 0.70 | 0.00 | 0.00 |
| ONSEN | 0.50 | 0.00 | 0.00 |
| LUNCH | 0.00 | 0.80 | 0.20 |
| FRANCE | 0.30 | 0.50 | 0.10 |
| COOKING INGREDIENT | 0.00 | 0.10 | 0.60 |
| SEASONING | 0.00 | 0.00 | 0.40 |
| MENU | 0.00 | 0.00 | 1.00 |

| PROGRAM / CATEGORY | TRAVEL | GOURMET | COOKING |
|---|---|---|---|
| XYZ TELEVISION DAY-TRIP TRAVELOGUE 9/1 (MON) 10:00~11:00 | 1.60 | 0.00 | 0.00 |
| XYZ TELEVISION GOURMET GUIDE 9/1 (MON) 14:00~15:00 | 0.30 | 1.30 | 0.30 |
| MAIASA BROADCAST HIDDEN ONSEN TOUR 9/1 (MON) 20:00~21:00 | 2.90 | 0.00 | 0.00 |
| YOMIKAI BROADCAST TODAY'S LUNCH 9/3 (WED) 10:00~10:30 | 0.00 | 0.10 | 1.60 |
| MAIASA BROADCAST ACCOMMODATIONS DIRECTORY 9/7 (SUN) 15:00~15:15 | 1.00 | 0.00 | 0.00 |
| XYZ TELEVISION HOW TO WALK ABROAD 9/8 (MON) 11:00~11:30 | 2.00 | 0.50 | 0.10 |

TRUE: EVALUATION VALUE ≧ THRESHOLD VALUE
FALSE: EVALUATION VALUE < THRESHOLD VALUE
HERE, THRESHOLD VALUE IS SET AS 0.50

(b)

| PROGRAM / CATEGORY | TRAVEL | GOURMET | COOKING |
|---|---|---|---|
| XYZ TELEVISION DAY-TRIP TRAVELOGUE 9/1 (MON) 10:00~11:00 | TRUE | FALSE | FALSE |
| XYZ TELEVISION GOURMET GUIDE 9/1 (MON) 14:00~15:00 | FALSE | TRUE | FALSE |
| MAIASA BROADCAST HIDDEN ONSEN TOUR 9/1 (MON) 20:00~21:00 | TRUE | FALSE | FALSE |
| YOMIKAI BROADCAST TODAY'S LUNCH 9/3 (WED) 10:00~10:30 | FALSE | FALSE | TRUE |
| MAIASA BROADCAST ACCOMMODATIONS DIRECTORY 9/7 (SUN) 15:00~15:15 | TRUE | FALSE | FALSE |
| XYZ TELEVISION HOW TO WALK ABROAD 9/8 (MON) 11:00~11:30 | TRUE | TRUE | FALSE |

(a)

(b)

| PROGRAM \ CATEGORY | TRAVEL | |
|---|---|---|
| | EVALUATION VALUE | ATTRIBUTE |
| XYZ TELEVISION DAY-TRIP TRAVELOGUE 9/1 (MON) 10:00~11:00 | 1.60 | TRUE |
| XYZ TELEVISION GOURMET GUIDE 9/1 (MON) 14:00~15:00 | 0.40 | FALSE |
| MAIASA BROADCAST HIDDEN ONSEN TOUR 9/1 (MON) 20:00~21:00 | 2.90 | TRUE |
| YOMIKAI BROADCAST TODAY'S LUNCH 9/3 (WED) 10:00~10:30 | 0.00 | FALSE |
| MAIASA BROADCAST ACCOMMODATIONS DIRECTORY 9/7 (SUN) 15:00~15:15 | 1.00 | TRUE |
| XYZ TELEVISION HOW TO WALK ABROAD 9/8 (MON) 11:00~11:30 | 2.00 | TRUE |

FIG. 10

| | | |
|---|---|---|
| RECOMMENDED PROGRAM IN THE CATEGORY "TRAVEL" | | |

| PROGRAM | BROADCAST STATION | BROADCAST DATE/TIME |
|---|---|---|
| HIDDEN ONSEN TOUR | MAIASA BROADCAST | 9/1 (MON) 7:00~8:00 |
| HOW TO WALK ABROAD | XYZ TELEVISION | 9/8 (MON) 11:00~11:30 |
| DAY-TRIP TRAVELOGUE | XYZ TELEVISION | 9/1 (MON) 10:00~11:00 |
| ACCOMMODATIONS DIRECTORY | MAIASA BROADCAST | 9/7 (SUN) 15:00~15:15 |

FIG. 12

| PROGRAM | RECOMMENDATION RANK VALUE |
|---|---|
| XYZ TELEVISION DAY-TRIP TRAVELOGUE<br>9/1 (MON) 10:00~11:00 | 1.20 |
| XYZ TELEVISION GOURMET GUIDE<br>9/1 (MON) 14:00~15:00 | 0.70 |
| MAIASA BROADCAST HIDDEN ONSEN TOUR<br>9/1 (MON) 20:00~21:00 | 2.18 |
| YOMIKAI BROADCAST TODAY'S LUNCH<br>9/3 (WED) 10:00~10:30 | 0.83 |
| MAIASA BROADCAST<br>ACCOMMODATIONS DIRECTORY<br>9/7 (SUN) 15:00~15:15 | 1.28 |
| XYZ TELEVISION HOW TO WALK ABROAD<br>9/8 (MON) 11:00~11:30 | 1.63 |

FIG. 13

| PROGRAM | BROADCAST STATION | BROADCAST DATE/TIME | CATEGORY |
|---|---|---|---|
| HIDDEN ONSEN TOUR | MAIASA BROADCAST | 9/1 (MON) 7:00~8:00 | TRAVEL |
| HOW TO WALK ABROAD | XYZ TELEVISION | 9/8 (MON) 11:00~11:30 | TRAVEL |
| DAY-TRIP TRAVELOGUE | XYZ TELEVISION | 9/1 (MON) 10:00~11:00 | TRAVEL |
| TODAY'S LUNCH | YOMIKAI BROADCAST | 9/3 (WED) 10:00~10:30 | COOKING |
| ACCOMMODATIONS DIRECTORY | MAIASA BROADCAST | 9/7 (SUN) 15:00~15:15 | TRAVEL |
| GOURMET GUIDE | XYZ TELEVISION | 9/1 (MON) 14:00~15:00 | GOURMET |

RECOMMENDED PROGRAM

FIG. 18

| CATEGORY / KEYWORD | TRAVEL | GOURMET | COOKING |
|---|---|---|---|
| LUNCH | 0.00 | 0.80 | 0.20 |
| FRANCE | 0.30 | 0.50 | 0.10 |
| COOKING INGREDIENT | 0.00 | 0.10 | 0.60 |
| SEASONING | 0.00 | 0.00 | 0.40 |
| MENU | 0.00 | 0.00 | 1.00 |

FIG. 19

| PROGRAM | KEYWORD INCLUDED IN PROGRAM DESCRIPTION | PREFERENCE PROGRAM? |
|---|---|---|
| PROGRAM A | FRANCE, COOKING INGREDIENT, MARKET | ○ |
| PROGRAM B | FRANCE, SEASONING, MENU, MARKET | × |
| PROGRAM C | LUNCH, COOKING INGREDIENT | ○ |
| PROGRAM D | MARKET | ○ |
| PROGRAM E | SEASONING, MENU | × |

| PROGRAM | TRAVEL | GOURMET | COOKING | PREFERENCE PROGRAM? |
|---|---|---|---|---|
| PROGRAM A | 0.30 | 0.60 | 0.70 | ○ |
| PROGRAM B | 0.30 | 0.50 | 1.50 | × |
| PROGRAM C | 0.00 | 0.90 | 0.80 | ○ |
| PROGRAM D | 0.00 | 0.00 | 0.00 | ○ |
| PROGRAM E | 0.00 | 0.00 | 1.40 | × |

TRUE: EVALUATION VALUE ≧ THRESHOLD VALUE
FALSE: EVALUATION VALUE < THRESHOLD VALUE
HERE, THRESHOLD VALUE IS SET AS 0.50

(b)

| PROGRAM | TRAVEL | GOURMET | COOKING | PREFERENCE PROGRAM? |
|---|---|---|---|---|
| PROGRAM A | FALSE | TRUE | TRUE | ○ |
| PROGRAM B | FALSE | TRUE | TRUE | × |
| PROGRAM C | FALSE | TRUE | TRUE | ○ |
| PROGRAM D | FALSE | FALSE | FALSE | ○ |
| PROGRAM E | FALSE | FALSE | TRUE | × |

| KEYWORD \ CATEGORY | TRAVEL | GOURMET | COOKING | USER PREFERENCE |
|---|---|---|---|---|
| LUNCH | 0.00 | 1.00 | 1.00 | 1.00 |
| FRANCE | 0.00 | 0.50 | 0.50 | 0.50 |
| COOKING INGREDIENT | 0.00 | 1.00 | 1.00 | 1.00 |
| SEASONING | 0.00 | 0.00 | 0.00 | 0.00 |
| MENU | 0.00 | 0.00 | 0.00 | 0.00 |
| MARKET | 0.00 | 0.33 | 0.33 | 0.67 |

⇓ DELETE KEYWORDS WHOSE CONTRIBUTION FACTOR IS "0" WITH RESPECT TO ALL CATEGORIES (b)

| KEYWORD \ CATEGORY | TRAVEL | GOURMET | COOKING | USER PREFERENCE |
|---|---|---|---|---|
| LUNCH | 0.00 | 1.00 | 1.00 | 1.00 |
| FRANCE | 0.00 | 0.50 | 0.50 | 0.50 |
| COOKING INGREDIENT | 0.00 | 1.00 | 1.00 | 1.00 |
| MARKET | 0.00 | 0.33 | 0.33 | 0.67 |

FIG. 23

2301 CATEGORY DICTIONARY

|  | CATEGORY A | CATEGORY B | CATEGORY C |
|---|---|---|---|
| KEYWORD a | 1.0 | 0.0 | 0.0 |
| KEYWORD b | 0.9 | 0.0 | 0.0 |
| KEYWORD c | 0.7 | 0.1 | 0.0 |
| KEYWORD d | 0.5 | 0.4 | 0.0 |
| KEYWORD e | 0.0 | 0.8 | 0.1 |

2401 CATEGORY DICTIONARY

|  | CATEGORY A | CATEGORY B | CATEGORY C |
|---|---|---|---|
| IDENTIFICATION | Color 1 | Color 2 | Color 3 |

FIG. 25

2501 CATEGORY EVLAUATION VALUE

|  | CATEGORY A | CATEGORY B | CATEGORY C |
|---|---|---|---|
| PROGRAM α | 5.2 | 0.0 | 0.0 |
| PROGRAM β | 3.4 | 0.0 | 0.0 |
| PROGRAM γ | 0.7 | 0.1 | 0.0 |
| PROGRAM δ | 0.0 | 7.4 | 3.0 |
| PROGRAM ε | 0.0 | 0.5 | 2.1 |

2601 PROGRAM CATEGORY

| | CATEGORY |
|---|---|
| PROGRAM α | CATEGORY A |
| PROGRAM β | CATEGORY A |
| PROGRAM γ | CATEGORY A |
| PROGRAM δ | CATEGORY B |
| PROGRAM ε | CATEGORY C |

2701 USER PREFERENCE FACTOR

| USER \ PREFERENCE FACTOR | CATEGORY A | CATEGORY B | CATEGORY C |
|---|---|---|---|
| 1 | 10% | 75% | 30% |
| 2 | 30% | 10% | 5% |

2801 PROGRAM RECOMMENDATION FACTOR

| USER1 | RECOMMENDATION FACTOR |
|---|---|
| PROGRAM α | 1 |
| PROGRAM β | 1 |
| PROGRAM γ | 1 |
| PROGRAM δ | 4 |
| PROGRAM ε | 3 |

| | | CATEGORY A | CATEGORY B | CATEGORY C | CATEGORY D | CATEGORY E |
|---|---|---|---|---|---|---|
| PROGRAM CATEGORY EVALUATION VALUE | PROGRAM X | 1.0 | 0.0 | 0.1 | 0.9 | 1.0 |
| USER PREFERENCE FACTOR | TARO「1」 | 1.0 | 0.0 | 0.3 | 0.8 | 1.0 |
| | HANAKO「2」 | 0.0 | 1.0 | 1.0 | 0.0 | 1.0 |

3101
3102

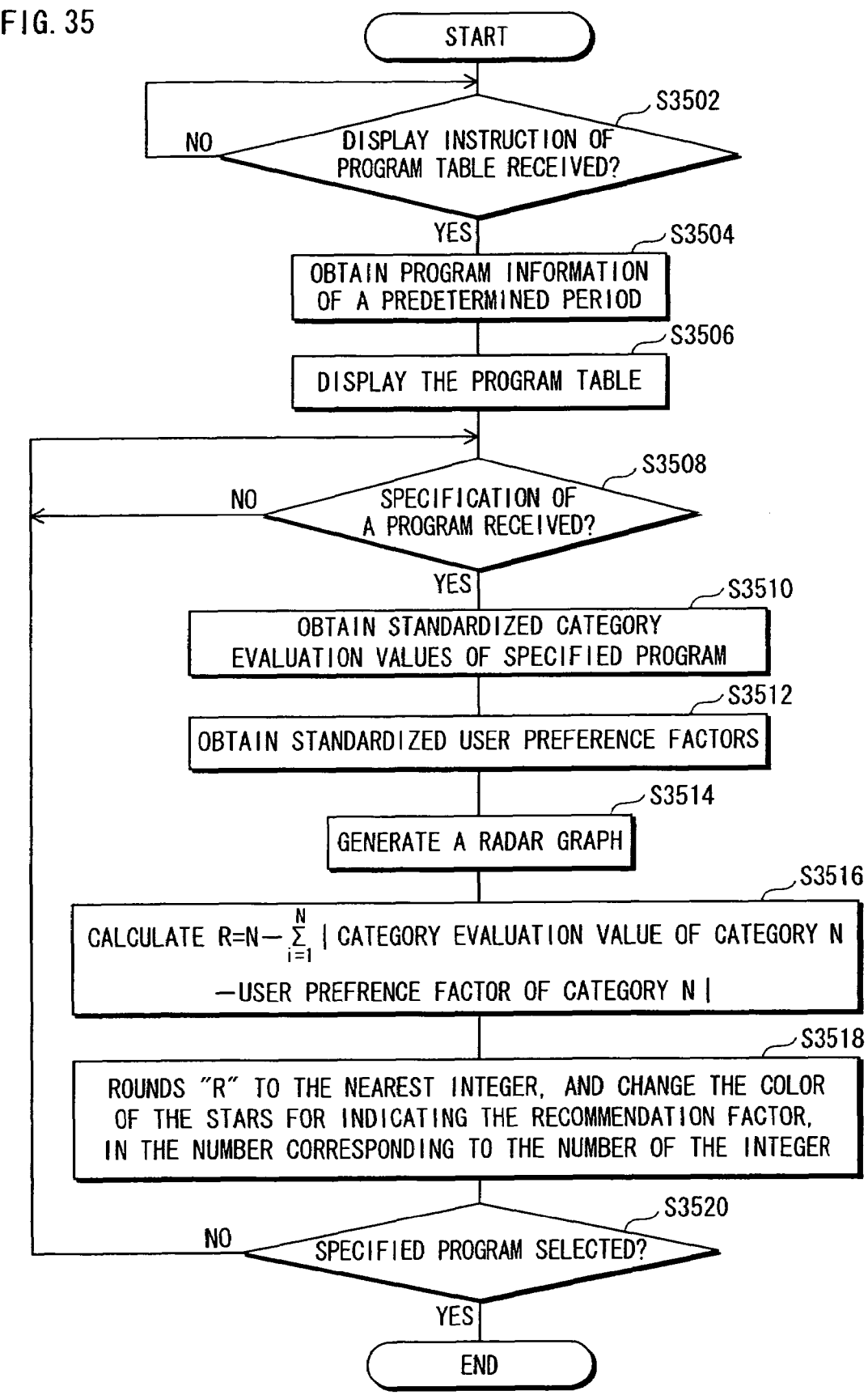

PROGRAM RECOMMENDATION APPARATUS, METHOD AND PROGRAM USED IN THE PROGRAM RECOMMENDATION APPARATUS

BACKGROUND OF THE INVENTION

1. Technical Field

The present invention relates to a program recommendation apparatus that recommends a program that matches a user preference with use of television program information such as an EPG (electronic program guide).

2. Background Art

A program recommendation apparatus performs program recommendation to determine recommended programs by performing category analysis for programs that a user has watched in the past, and categorizing programs broadcast in the future, and deciding recommended programs using the result of category analysis for watched programs and the result of categorizing future programs.

Category analysis is performed using a category dictionary and an EPG every time a user performs a record presetting. A category dictionary is a dictionary in which categories and a plurality of keywords for each category are registered. When a user performs a record presetting, a program recommendation apparatus extracts a program description from the EPG, which corresponds to the record-preset program. Then the number of keywords existing in the description is counted for each category. A program description contains many words. In addition, there are many keywords for each category. Whenever a word used in a program description matches a keyword of a category, the occurrence of matching keyword in the category is incremented by 1. Then eventually, it is possible to know which category of keywords the description of the record-preset program includes the most. Here, programs that a user has watched include programs selected by chance through channel selection processing. On the contrary, a user intended to watch record-preset programs. When description of such record-preset programs includes a large number of keywords belonging to a certain category, it means that the user has a strong preference toward programs grouped in the category. The above-described counting processing is repeated for a month every time a record presetting is performed. Then eventually, the user's tastes for program categories can be known. In the above way, the category analysis reveals program categories of a user's preference.

On the other hand, the categorizing is performed using an EPG and a category dictionary at regular timings such as at the beginning of a week or a month. More specifically, the program recommendation apparatus obtains an EPG at the beginning of a week or a month, and extracts description text of a program that is to be broadcast in the future. Then the number of keywords included in the description text is counted. Once the result of the counting for each category is obtained, a category to which the largest number of words included in the description text belongs is known. A program is considered to belong to a particular category if the description of the program includes many words belonging to the particular category. In this way, a category to which a program to be broadcast in the future belongs is revealed according to the categorizing.

The category analysis reveals categories of programs that a user has watched, and the categorizing reveals to which category each program to be broadcast in the future belongs. As a result, future programs belonging to the category of programs that the user has watched many times are recommended to the user. According to the processing, a user will be reminded of a program that matches his preference but is easy to be missed.

Some program recommendation methods use a technology of assigning different weights to the result of counting directed to each category of future programs, according to the result of counting for each category resulting from the category analysis, thereby recommending higher-rank programs from the result of the weighing. As can be understood, the processing such as category analysis and categorizing described above largely depend on keyword search with use of a category dictionary.

Some keywords are very important for a category, while other keywords are not so important. Important keywords to a category are keywords only used in the programs of the category. In this sense, important keywords are special keywords while not so important keywords are general words that can be used in programs in other categories. For example, suppose there are keywords "accommodations" and "France" for a category of "travel". As the word "accommodations" reminds most people of "travel", "accommodations" is a keyword very important to and closely associated with the category of "travel". On the contrary, the keyword "France" is a general word which can also be used in many categories other than "travel" Therefore the keyword "France" is not so important for the category of "travel". It is not guaranteed that only important keywords to a category appear in the program description text in an EPG. In a category dictionary, words included in a program description are registered as keywords. Therefore, even when a keyword is not important for a category, it has a chance of being important for another category. In conventional category analysis and categorizing, only the number of keyword appearing in program descriptions is a focus of attention, and so the category analysis and categorizing cannot accurately incorporate a user's preference and programs' contents. This inhibits recommendation of proper programs that are in accordance with a user's preference.

It is also difficult to classify programs' contents into one category or represent a user's preference by one category.

SUMMARY OF THE INVENTION

The present invention has been conceived in view of the above-described problems, and has an object of classifying programs' contents into a correct category using a keyword dictionary that takes into account importance of each keyword to each category, thereby providing a program recommendation apparatus that is able to recommend a program in accordance with a user's preference.

The above-stated object is achieved by a program recommendation apparatus having: a program information storage unit operable to store therein program information of television programs; a category dictionary containing words included in the program information as keywords, where each of the keywords is stored in association with contribution factors assigned with respect to categories respectively, the programs being classified into the categories; an evaluation value calculation unit operable to, for each of the programs, a) search program information of the program for the keywords contained in the category dictionary, b) for any found keywords, obtain category summations of contribution factors of the found keywords for each of the categories, and c) calculate category evaluation values of the program according to the category summations of the contribution factors; a user-preference-factor storage unit operable to store therein user preference factors, each user preference factor indicating a user's preference toward a corresponding category and being shown in numerical form corresponding to the category evaluation values; and a recommending unit operable to recommend one or more programs to the user according to a degree of similarity between the category evaluation values of the programs and the user preference factors.

With the stated construction, it becomes possible to obtain category evaluation values that reflect programs' contents for respective categories, and to recommend programs according to a degree of similarity between the category evaluation values shown on the basis of categories and the category evaluation values of each program. As a result, it is assured to recommend programs that the user would prefer.

Here, the program recommendation apparatus may further have: a history storing unit operable to store therein a history of programs the user has watched or recorded in the past; a category evaluation value storage unit operable to store therein the category evaluation values of the programs calculated by the evaluation value calculation unit; and a user-preference-factor analysis unit operable to, for the programs included in the history, a) obtain corresponding category evaluation values from the category evaluation value storage unit, b) obtain category summations of the corresponding category evaluation values, c) set the user preference factors as the category summations of the corresponding category evaluation values respectively, in relation to a summation of the corresponding category evaluation values across the categories, and d) store the user preference factors to the user-preference-factor storage unit.

With the stated construction, the user preference factor, reflecting a user's preference, is able to be represented as a value corresponding to the category evaluation value that is for categorizing each program. Accordingly, it becomes possible to recommend programs that a user would prefer.

Here, the recommending unit has: a recommendation factor calculation subunit operable to calculate a recommendation factor for a corresponding one of the programs, by a) calculating, with respect to each of the categories, a difference of a corresponding category evaluation value and a corresponding user preference factor, b) summing thus calculated differences across the categories, c) subtracting the summation of the differences from the total number of the categories, and d) setting a value obtained by the subtraction as the recommendation factor; and a recommended program determining subunit operable to determine, as the recommended programs, programs having high recommendation factors calculated in the recommendation factor calculation subunit.

With the stated construction, recommendation factor that shows whether a program matches a user's preference is calculated from a difference between a category evaluation value and a user preference factor, for each program. Therefore, program recommendation becomes more accurate.

Here, the program recommendation apparatus may further have: a storage unit operable to store identification information for visually identifying a corresponding category; a categorizing unit operable to categorize each program in the program information storage unit into a category with respect to which the program has the highest category evaluation value; and a program-table display control unit operable to display a program table, in which each program represents a category to which the program is categorized, using the identification information stored in the storage unit.

With the stated construction, a user can have a general grasp of contents of a program by looking at a displayed program table.

Here, the program recommendation apparatus may further have: a program specification reception unit operable to receive specification of a program from the displayed program table, where the program-table display control unit displays a recommendation factor of the specified program together with the program table.

With the stated construction, when a user specifies a program by looking at a program table, the recommendation factor of a program is displayed. Therefore, it is easy to judge whether the program matches a user's preference.

Here, the program recommendation apparatus may further have: a user-preference-factor display control unit operable to perform control so that each of the user preference factors stored in the user-preference-factor storage unit is displayed to represent a corresponding category in a visually distinguishable manner from the other categories; a modification instruction reception unit operable to receive, from the user, an instruction to modify a user preference factor of a category currently on display; and a modification unit operable to modify contents stored in the user-preference-factor storage unit, in accordance with the received instruction.

With the stated construction, a user can modify the preference on display at anytime he wants, and accordingly change recommended programs for him.

Here, the program recommendation apparatus may further have: a keyword adding unit operable, when the summation of the category evaluation values for all the categories is 0 for a program included in the history stored in the history storage unit, to perform keyword addition by extracting words from the program's program information; a categorizing unit operable to categorize each program, which is broadcast during a predetermined period, into a category with respect to which the program has the highest category evaluation value; and a contribution factor assigning unit operable to assign, for each keyword added by the keyword adding unit, contribution factors for categories respectively, where a contribution factor for a category is calculated as a value having: as a denominator, the number of times the added keyword appears in program information of all the programs during the predetermined period; and as a numerator, the number of times the added keyword appears in program information of programs of the category.

With the stated construction, the category dictionary is capable of being adjusted to the change in program information of programs. Accordingly, even when there is a change in the contents of programs, it is still possible to recommend programs that match a user's preference.

The above-stated object may also be achieved by a program recommendation method used in a program recommendation apparatus that has a category dictionary containing words included in program information of television programs as keywords, where each of the keywords is stored in association with contribution factors assigned with respect to categories respectively, the programs being classified into the categories, the program recommendation method having: a program information recording step of recording the program information of the programs; an evaluation value calculation step of, for each of the programs, a) searching program information of the program for the keywords contained in the category dictionary, b) for any found keywords, obtaining category summations of contribution factors of the found keywords for each of the categories, and c) calculating category evaluation values of the program according to the category summations of the contribution factors; a user-preference-factor recording step of recording user preference factors, each user preference factor indicating a user's preference toward a corresponding category and being shown in numerical form corresponding to the category evaluation values; and a recommending step of recommending one or more programs to the user according to a degree of similarity between the category evaluation values of the programs and the user preference factors.

With the stated method, it becomes possible to obtain category evaluation values that reflect programs' contents for respective categories, and to recommend programs according to a degree of similarity between the category evaluation values shown on the basis of categories and the category evaluation values of each program. As a result, it is assured to recommend programs that the user would prefer.

The above-stated object may also be achieved by a program for making a program recommendation apparatus that has a category dictionary containing words included in program information of television programs as keywords, where each of the keywords is stored in association with contribution factors assigned with respect to categories respectively, the programs being classified into the categories, to perform: a program information recording step of recording the program information of the programs; an evaluation value calculation step of, for each of the programs, a) searching program information of the program for the keywords contained in the category dictionary, b) for any found keywords, obtaining category summations of contribution factors of the found keywords for each of the categories, and c) calculating category evaluation values of the program according to the category summations of the contribution factors; a user-preference-factor recording step of recording user preference factors, each user preference factor indicating a user's preference toward a corresponding category and being shown in numerical form corresponding to the category evaluation values; and a recommending step of recommending one or more programs to the user according to a degree of similarity between the category evaluation values of the programs and the user preference factors.

By applying the stated program to the program recommendation apparatus, it becomes possible to recommend programs that a user would prefer.

BRIEF DESCRIPTION OF THE DRAWINGS

FIG. 2 is a diagram showing one example of EPG that an EPG obtaining unit obtains.

FIG. 3 is a diagram showing one example of category dictionary.

FIG. 5A is a diagram showing evaluation values of each program with respect to each category.

FIG. 5B is a diagram showing program category attributes for programs respectively.

FIG. 10 is a diagram showing that recommended programs belonging to the category "travel" are displayed on a screen.

FIG. 12 is a diagram showing recommendation rank values for programs, respectively.

FIG. 13 is a diagram showing that programs, which are recommended based on the recommended rank values for the programs respectively, are displayed.

FIG. 18 is a diagram showing one example of category dictionary.

FIG. 19 is a diagram showing keywords included in program description of programs and whether these programs are the user's preference programs.

FIG. 20A is a diagram showing evaluation values of programs for each category.

FIG. 20B is a diagram showing program category attributes of programs, respectively.

FIG. 21A is a diagram showing the result in which contribution factors of all the keywords are updated.

FIG. 21B is a diagram showing the result in which every keyword whose contribution factor is 0.00 in every category is deleted from the category dictionary.

FIG. 23 is a diagram showing one example of category dictionary stored in a category dictionary storage area of the above-stated embodiment.

FIG. 24 is a diagram showing one example of category identification information stored in a category identification information storage area of the above-stated embodiment.

FIG. 25 is a diagram showing program category evaluation value stored in a program category evaluation value storage area of the above-stated embodiment.

FIG. 26 is a diagram showing one example of program category stored in a program category storage area of the above-stated embodiment.

FIG. 27 is a diagram showing one example of user preference factor stored in a user preference factor storage area of the above-stated embodiment.

FIG. 28 is a diagram showing one example of recommendation factor stored in a recommendation factor storage area of the above-stated embodiment.

FIG. 31 is a diagram showing a concrete example of program category evaluation value and user preference factor for calculating recommendation factor relating to the above-stated embodiment.

FIG. 35 is a flowchart for explaining the operation of the above-stated embodiment.

DESCRIPTION OF SIGNS

Figure 1:
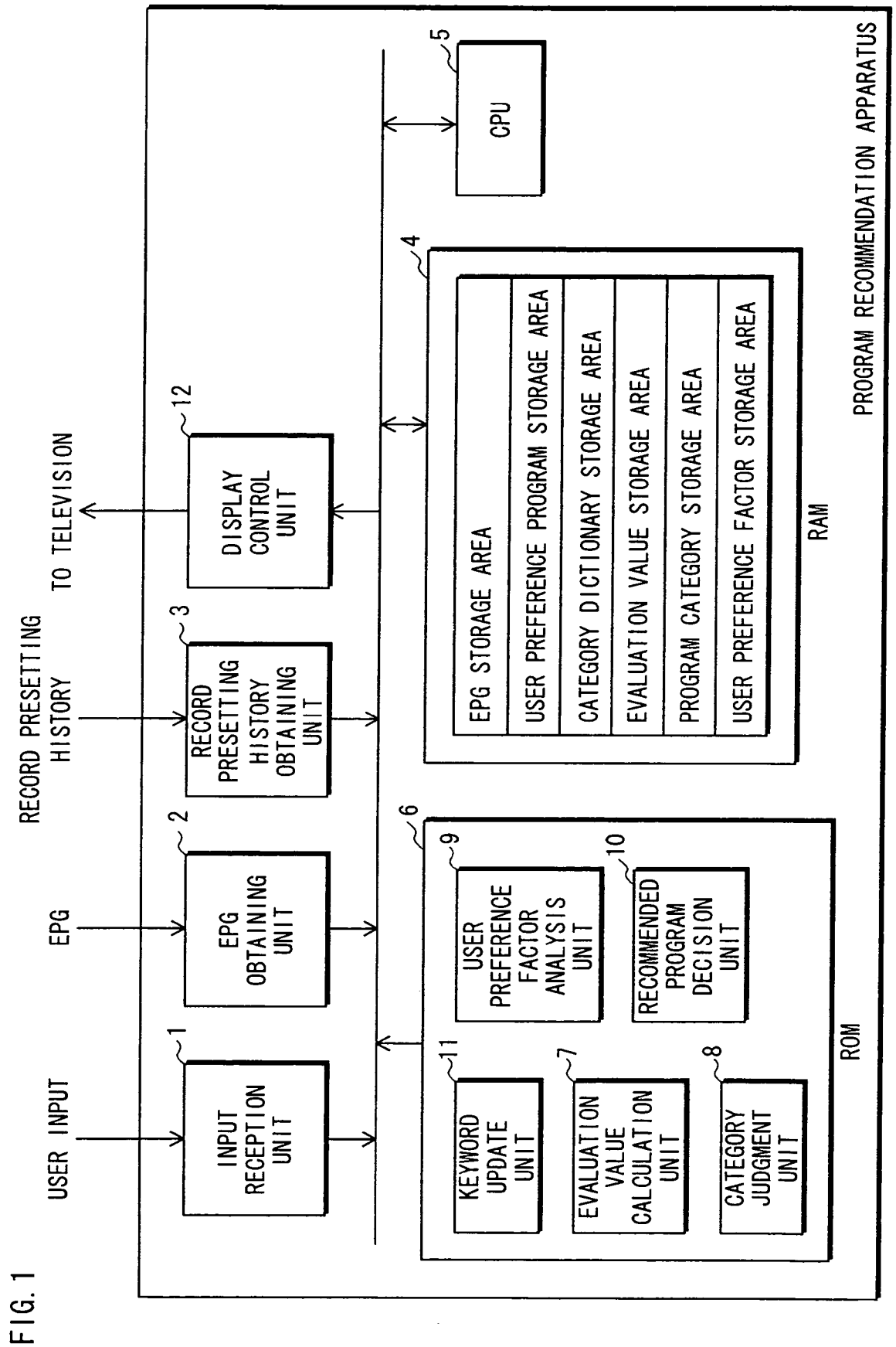
FIG. 1 is a structural diagram showing a first embodiment of a program recommendation apparatus relating to the present invention.

1 Input reception unit
2 EPG obtaining unit
3 Record-presetting history obtaining unit
4 RAM
5 CPU
6 ROM
7 Evaluation calculation unit
8 Category judgment unit
9 User preference factor analysis unit
10 Recommended program decision unit
11 Keyword update unit
12 Display control unit
2201 RAM
2202 Control unit
2203 Program information obtaining unit
2204 User input reception unit
2205 Decoder
2210 Program information storage area
2211 User preference program storage area
2212 Category dictionary storage area
2213 Category identification information storage area
2214 Program category evaluation value storage area
2215 Program category storage area
2216 User preference factor storage area
2217 Program recommendation factor storage area
2218 Recommended program storage area
2219 GUI management information storage area
2220 Keyword update unit
2221 Program category evaluation value calculation unit
2222 Program category judgment unit
2223 User preference factor analysis unit
2224 Recommendation factor calculation unit
2225 Recommended program decision unit
2226 User preference factor adjustment unit
2227 GUI control unit
2230 GUI generating unit
2231 AV decoder
3301 Period program information obtaining unit
3302 Specified program information obtaining unit
3303 Category identification unit
3304 Program table creation unit
3305 Specified program description frame creation unit
3306 Evaluation value graphing unit
3307 Specified program contents frame creation unit
3308 Display information synthesizing unit

DETAILED DESCRIPTION OF THE INVENTION

The following describes embodiments of the program recommendation apparatus according to the present invention, with reference to the drawings.

First Embodiment

FIG. 1 is a structural diagram showing the first embodiment of a program recommendation apparatus relating to the present invention. The program recommendation apparatus is structured by an input reception unit 1, an EPG obtaining unit 2, a record-presetting history obtaining unit 3, a RAM 4, a CPU 5, a ROM 6, and a display control unit 12.

The input reception unit 1 performs operations in the program recommendation apparatus upon receiving a user input. The operations performed by the input reception unit 1 includes selection of a program that the user has found interesting from an EPG, and adjusting a user preference factor shown according to each category. The user preference factor according to each category shows which category of programs the user would prefer.

The EPG obtaining unit 2 obtains program information such as an EPG distributed through a broadcast wave or the Internet. FIG. 2 is a diagram showing one example of EPG that the EPG obtaining unit 2 obtains. As this diagram shows, the EPG has such items as a program title, a broadcast date, a broadcast station, cast, program description, and genre. The obtained EPG is stored in the RAM 4.

The record-presetting history obtaining unit 3 obtains a presetting history showing which program the user has preset for recording, from a recording apparatus (e.g. DVD recorder) connected to the program recommendation apparatus. The obtained presetting history is stored in the RAM 4. Here, the obtained presetting history is information such as broadcast date and broadcast station for identifying a program that the user has preset for recording. If an ID is assigned to each program, only the ID may be obtained.

The RAM 4 is a memory for storing therein various kinds of information used in processing for deciding a recommended program. The RAM 4 includes an EPG storage area, a user preference program storage area, a category dictionary storage area, an evaluation value storage area, a program category storage area, and a user preference factor storage area.

The EPG storage area is for storing therein an EPG that the EPG obtaining unit 2 obtains.

The user preference program storage area is for storing therein information for identifying each user preference program. Here, the programs included in the presetting history obtained by the record-presetting history obtaining unit 3 are treated as user preference programs respectively. In addition, any program that the user has found interesting after watching it can be registered as a user preference program by selection from an EPG. Here too, what is stored is information for identifying programs, and not all data in the EPG.

The category dictionary storage area stores therein a category dictionary. A category dictionary is a dictionary in which a plurality of keywords are registered in association with respective contribution factors for each category. "Category" defined in the category dictionary is a framework different from "genre" indicated in an EPG. According to each category, programs included in an EPG are assigned respective points, using keywords belonging to each category, and programs belonging to a category that the user showed preference is recommended to the user. Assignment of point according to each category is performed as follows. First, for each program, items in the program description of the EPG are searched for the keywords included in the category dictionary. Then, for each category, the number of keywords appearing in the program description is counted. Finally, points according to respective categories are obtained by multiplying the obtained number of keywords by corresponding contribution factors to the keywords.

FIG. 3 shows one example of category dictionary. As shown in this drawing, the category dictionary is constituted by a plurality of keywords to which contribution factors (i.e. numerical value in the range of "0.00-1.00") are assigned according to the categories. Here, contribution factor is indicated by a numerical value for showing an importance of a keyword to a corresponding category. Therefore a special keyword almost exclusively used in a particular category is assigned a very high numerical value with respect to the category. For example, the keyword "accommodations" is assigned a contribution factor of "1.00" with respect to the category of "travel". Such a high numerical value indicates that a corresponding keyword is very important in calculating an evaluation value in the category. On the contrary, a keyword that does not have relation to the category and is not so necessary in calculation of an evaluation value is assigned a numerical value of "0.00". For example, "menu" is assigned "0.00" with respect to the category of "travel", and so is considered a keyword not taken into account in calculation of an evaluation value in the category of "travel". In the present invention, other values than "0.00" and "1.00" can also be assigned. This is the case where there are general keywords exist that can be shared in a plurality of categories. One example of such general keywords is "France". In this drawing, the contribution factor of "France" is set as 0.30 for the category "travel", 0.50 for the category "gourmet", and 0.10 for the category "cooking". This is helpful in case where program description of EPG includes many keywords used across a plurality of categories. More specifically, by doing in the above way, the credibility of category evaluation value of keyword is enhanced by calculating evaluation value that takes into account the importance of the keyword for each category. Such keywords and their contribution factors can also be updated from initially set numerical values according to information relating to user preference programs. This structure further facilitates program recommendation that matches users' preferences.

The evaluation value storage area is for storing evaluation values of programs for each category. Here, the evaluation values are obtained in the following way. The program descriptions in the EPG are searched for keywords registered in the category dictionary, and then the number of times each keyword has appeared is counted. The obtained number of appearance times is then assigned respective weights. The resulting points are considered as the evaluation values of programs for each category.

The program category storage area is for storing therein information on a category to which each program belongs, based on the evaluation value of the program for each category.

The user preference factor storage area is for storing therein information showing user preference for each category. The information shows which category of programs a user would prefer.

The CPU 5 performs overall control of the program recommendation apparatus by executing programs stored in the ROM 6.

The ROM 6 stores therein programs for realizing various types of processing in the program recommendation apparatus. The programs are read by the CPU 5 and then work together with hardware resources, so as to function as concrete means of an evaluation calculation unit 7, a category judgment unit 8, a user preference factor analysis unit 9, a recommended program decision unit 10, and a keyword update unit 11. These functional units of the ROM 6 are described as follows.

The evaluation value calculation unit 7 calculates evaluation values of each program with respect to respective categories, using each keyword included in the program descriptions of an EPG having been read from the RAM 4 and contribution factors of the keyword found in the category dictionary. The evaluation value calculation unit 7 stores calculated evaluation values for each category in the evaluation value storage area of the RAM 4. FIG. 5A is a diagram showing evaluation values for each program with respect to respective categories. Here, an evaluation value of "0.00" either indicates that the contribution factors of corresponding keywords included in the corresponding program description in the EPG are all 0.00 with respect to the category, or that no keyword in the category dictionary exists in the program description.

The category judgment unit 8 judges whether the evaluation values for each program with respect to respective categories, which have been calculated by the evaluation value calculation unit 7, are either lager or smaller than a corresponding threshold value already set, and judges which category the program belongs to, thereby performing categorizing of programs. Then, the category judgment unit 8 stores the result in the program category storage area of the RAM 4. FIG. 5B is a diagram showing program category attributes having resulted from the above judgment. Here, where an attribute of a program is "TRUE", it indicates that the corresponding evaluation value is larger than the threshold value, which indicates that the program has been judged to belong to the category. On the contrary, where an attribute of a program is "FALSE", it indicates that the corresponding evaluation value is smaller than the threshold value, which indicates that the program has been judged not to belong to the category.

The user preference factor analysis unit 9 performs category analysis on the history of record presetting that a user has done during a predetermined period in the past, thereby obtaining user preference factors for respective categories. Specifically, programs that the user has preset during the predetermined period in the past are selected from the user preference program storage area of the RAM 4, and analyzed. User preference factors resulting from this analysis are stored in the user preference factor storage area of the RAM 4.

The recommended program decision unit 10 adds weight to evaluation values of each program with respect to respective categories, having been calculated by the evaluation value calculation unit 7, by referring to the user preference factors for the respective categories obtained by the user preference factor analysis unit 9, thereby obtaining recommendation rank values for the programs respectively. Then, based on the calculated recommendation rank values, the recommended program decision unit 10 decides a recommended program, and passes information relating to the decided recommended program to the display control unit 12.

The keyword update unit 11 performs adding of a keyword to the category dictionary, update of contribution factor of a keyword with respect to each category, and deletion of a keyword. Adding processing is performed based on the evaluation values of every user preference program during the predetermined period in the past. More specifically, adding processing is performed when the evaluation values of the user preference program are "0.00" for all the categories (i.e. when the category dictionary does not include any word included in the program description of the user preference program). Then, update of contribution factor with respect to each category is performed for all the keywords in the category dictionary, including new keywords added by the above-described adding processing. The update processing is performed for each of corresponding keywords with respect to each category, according to a ratio between i) the number of the keyword that appears in program description of every program during the predetermined period in the past and ii) the number of the keyword that appears in the program description of every user preference program. After completion of the processing for each of the corresponding keywords, when there is any keyword whose contribution factor is 0.00 for every category, the keyword is deleted from the category dictionary.

The display control unit 12 performs control so as to display a recommended program decided in the recommended program decision unit 10 or the user preference factor obtained by category analysis performed by the user preference factor analysis unit 9, in form of graphs using a display apparatus connected to the program recommendation apparatus. One example of the display apparatus is a television. Here, note that a user is able to modify a user preference factor according to his operation directed to the input reception unit 1 by looking at the graphs on display.

The following describes the operations of the program recommendation apparatus relating to the present invention, by way of concrete examples.

FIG. 2 shows one example of EPG, and FIG. 3 shows one example of category dictionary. Regarding these drawings, the following describes a method of deciding a recommended program out of the six programs found in the EPG. Explanation on FIG. 2 and FIG. 3 is given earlier in the present description, and so will not be repeated in the following.

First, the program description of the EPG is searched for keywords registered in the category dictionary. Then for each keyword, the number of appearance times is assigned a corresponding contribution factor with respect to each of categories, thereby obtaining evaluation values of each program for the categories. The following describes this processing in detail, using the flow (FIG. 4) of the evaluation value calculation processing for each program for each category, performed by the evaluation value calculation unit 7.

First, a program description of a program P is read from an EPG stored in the RAM 4 (Step S1). Next, the program description of the program P is searched for each keyword included in the category dictionary, thereby counting the number of times each matching keyword appears. Then the contribution factor of each matching keyword is read from the category dictionary of the RAM 4 (Step S2). Then all the read contribution factors for the category C are summed together, thereby calculating an evaluation value PE[C,P] of the program P with respect to the category C (Step S3). When the processing from Step S2 to Step S3 is complete for all the categories (Step S4), and the processing from Step S1 to Step S4 is complete for all the programs (Step S5), the evaluation value calculation processing for each category for each program is considered complete.

FIG. 5A is a diagram showing evaluation values of each program for each category, which have been calculated based on the above-described flow.

FIG. 5B is a diagram showing program category attributes of programs determined based on the result of FIG. 5A. Here, the threshold value is set as "0.50", and when an evaluation value exceeds this threshold value, "TRUE" is drawn, and the program is judged to belong to the category. On the contrary, when an evaluation value falls below the threshold value, "FALSE" is drawn, and the program is judged not to belong to the category. Each program is categorized in this way. As shown in these drawings, the program "how to walk abroad" belongs to both of the categories "travel" and "gourmet". As in this case, a program may belong to a plurality of categories depending on how to set the threshold value. This affects recommendation of programs by means of categories. For example, when the threshold value is set to be low, judgment of category becomes lenient, thereby enabling recommendation of a wider range of programs to a user. On the contrary, when the threshold value is set to be high, judgment of category becomes strict, thereby enabling recommendation of a narrower range of programs.

Figure 6:
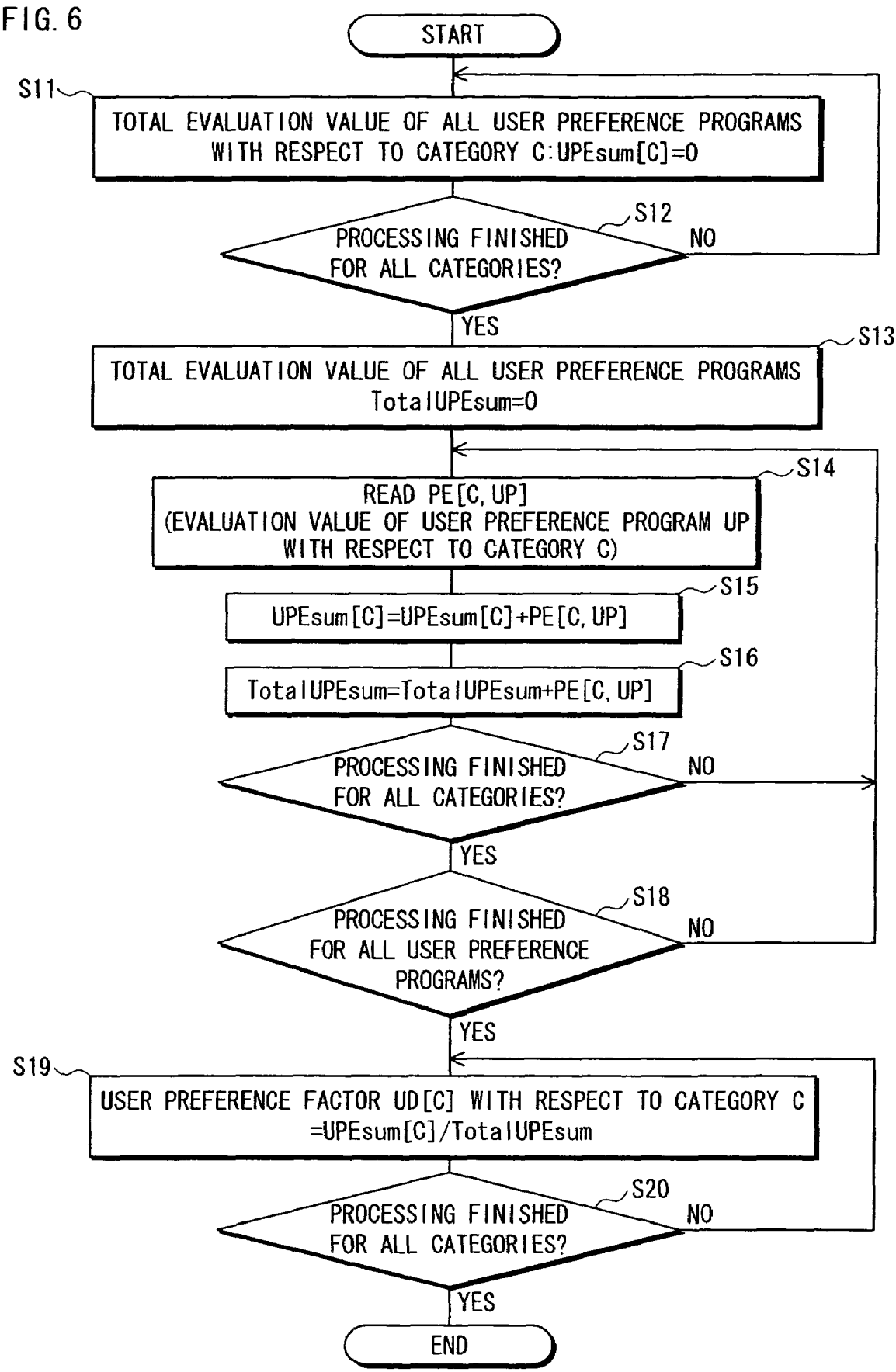
FIG. 6 is a diagram showing a flow of category analysis processing performed by a user preference factor analysis unit.

Next, category analysis processing for obtaining user preference factor is described. The description is given by referring to FIG. 6 showing the flow of category analysis processing performed by the user preference factor analysis unit 9.

First, the total evaluation value (UPEsum[C]) of all the user preference programs with respect to the category C is set as "0" (Step S11). Processing of Step S11 is performed to all the categories (Step S12), and the total evaluation value (TotalUPEsum) of all the user preference programs is set as "0" (Step S13). Next, the evaluation value PE[C,UP] for the category C of the user preference program UP is read from the RAM 4 (Step S14). (PE[C,UP]) is added to (UPEsum[C]) (Step S15). (PE[C,UP]) is added to (TotalUPEsum) (Step S16). When the processing from Step S14 to Step S16 is complete for all the categories (Step S17), and the processing from Step S14 to Step S17 is complete for all the user preference programs (Step S18), the total evaluation value (UPEsum[C]) of all the user preference programs for the category C is divided by the total evaluation value (TotalUPEsum) for all the user preference programs, to obtain a user preference factor UD[C] for the category C (Step S19). When the process of Step S19 is performed for all the categories (Step S20), the category analysis processing is ended.

Figure 7:
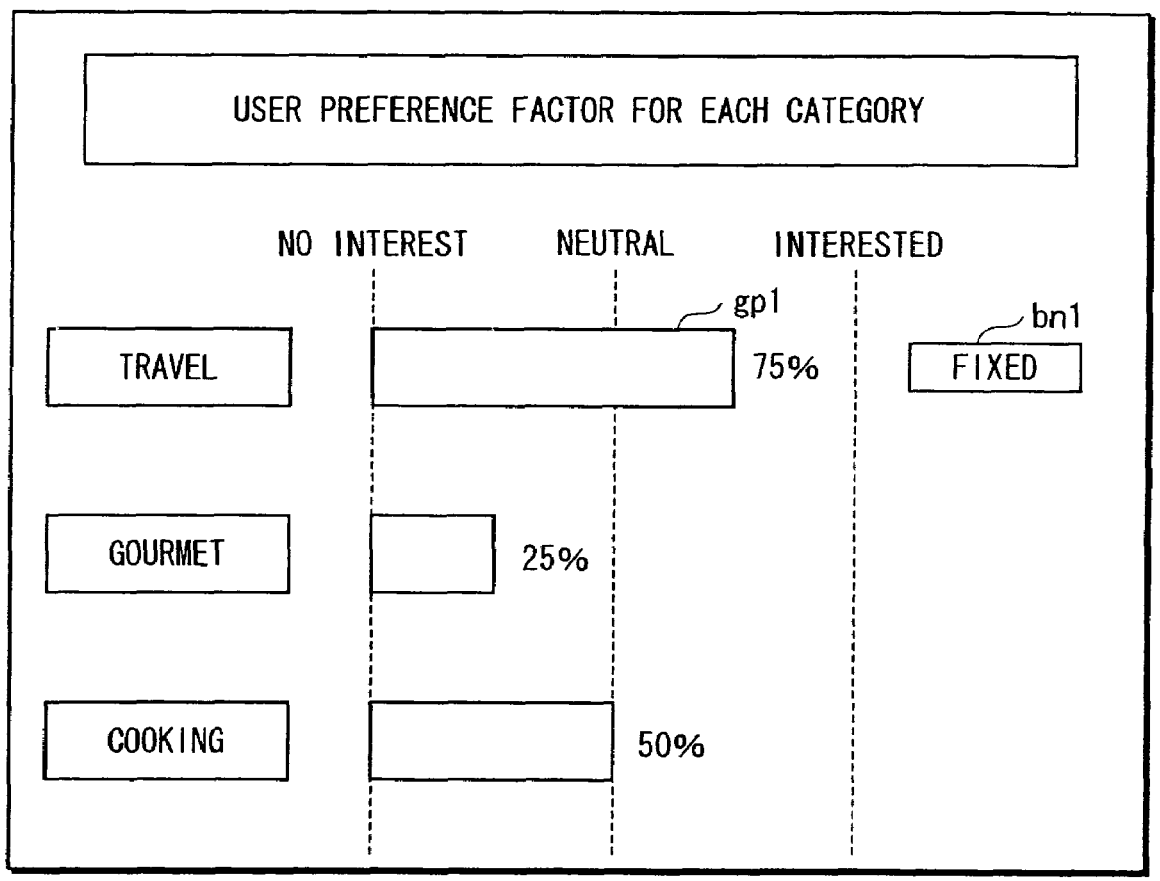
FIG. 7 is a diagram showing a screen display of user preference factors for each category.
Figure 8:
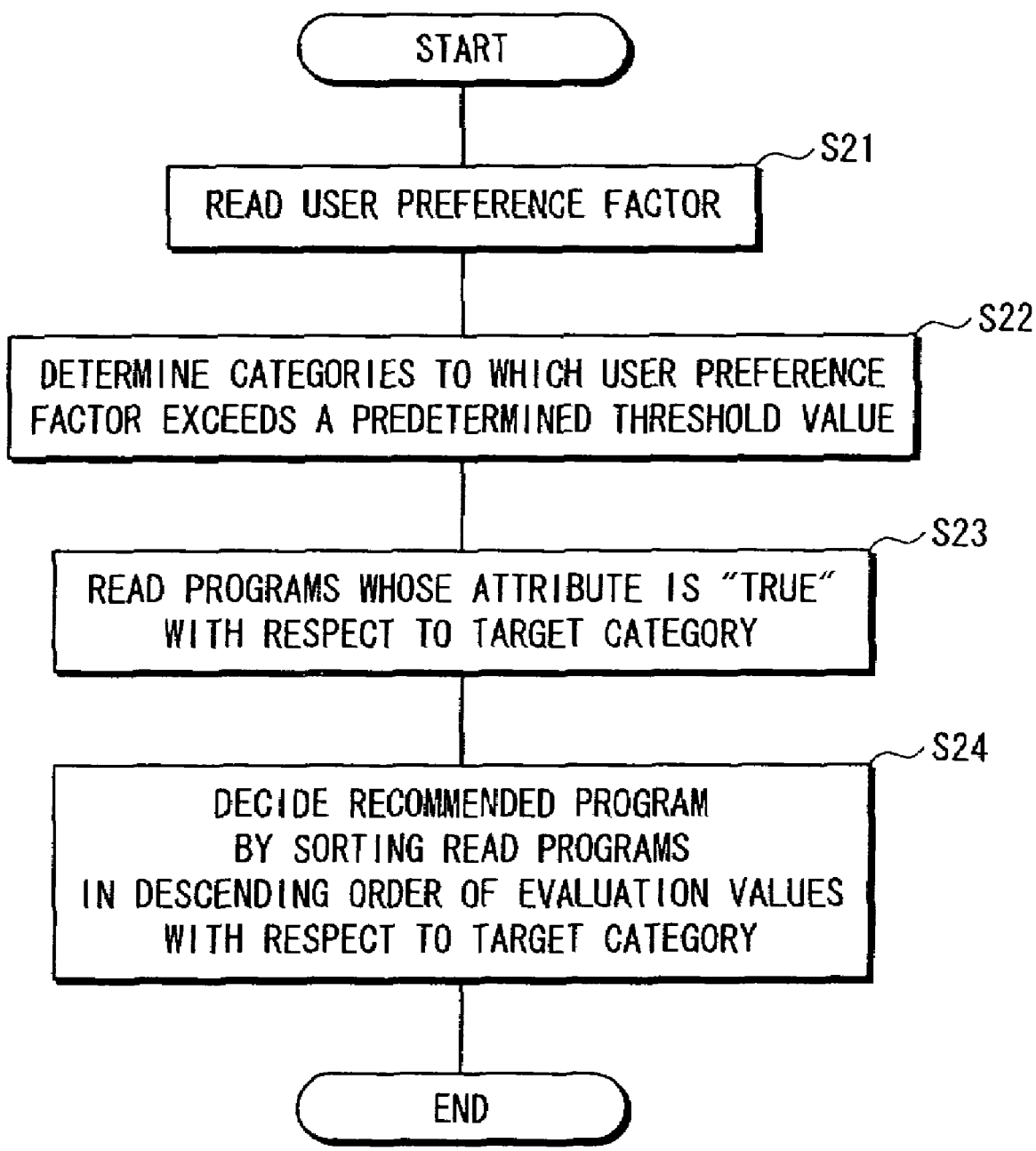
FIG. 8 is a diagram showing a flow of deciding processing of recommended programs for categories respectively, performed by a program recommendation unit.

User preference factor obtained in the above way can be displayed on a screen as shown in FIG. 7. FIG. 7 shows a screen illustrating user preference factor for each category in bar graph. The screen is displayed in a display apparatus connected to the program recommendation apparatus. Bar graph representation of user preference factor as in this drawing is advantageous in that a user can grasp how the program recommendation apparatus recognizes his program preference. User preference factor for each category obtained by the user preference factor analysis unit 9 is temporarily stored in the RAM 4. When the input reception unit 1 receives a user instruction to display a screen, the user preference factor is read from the RAM 4, and the display control unit 12 generates display information. When the user is not satisfied about the result displayed on the screen, he can modify the numerical value for a bar graph of his choice into a desired numerical value, by an operation directed to an input unit provided for the front panel of the program recommendation apparatus or via a remote controller. The operation is equivalent to the case of adjusting image quality for televisions. If a user would like to fix the numerical value of a certain category irrespective of a user's operation, all he has to do is to select the fix button "bn1" with respect to a corresponding category, as shown in the drawing.

Next, program recommendation processing is described. There are two methods of program recommendation processing. One method is to recommend programs from selected categories. The other method is to recommend programs from all the programs without making distinction of categories.

Firstly, a method of recommending programs from selected categories is described below.

First, user preference factor for each category is read from the RAM 4 (Step S21). Every category whose user preference factor exceeds the already-set threshold value is determined (Step S22). For the categories whose user preference factor is judged to exceed the threshold value, every program whose attribute value is "TRUE" is read from the RAM 4 (Step S23). Thus read programs are sorted in the descending order of the evaluation values, thereby deciding recommended programs (Step S24).

Figure 9:
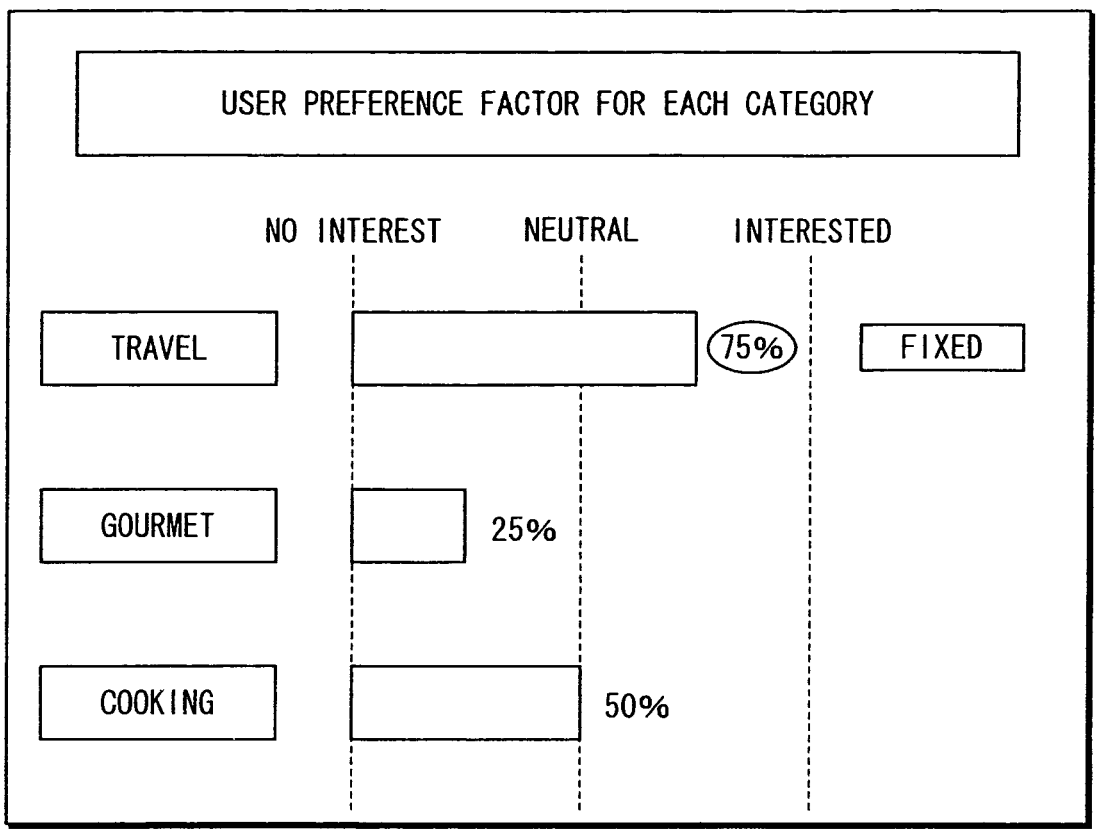
FIG. 9A is a diagram showing that a category whose user preference factor exceeds a threshold value is considered as "travel".
FIG. 9B is a diagram that programs belonging to the category "travel" have been extracted.

FIG. 9A and FIG. 9B are diagrams for explaining one example of deciding a recommended program based on the above-stated flow.

FIG. 9A is a diagram showing user preference factor for each category explained with FIG. 7. Here, if the threshold value is assumed to be set to 70%, then recommended programs will be selected from the category "travel". FIG. 9B is a diagram showing evaluation value and attribute value of each of the programs with respect to the category "travel". Among the programs, only programs whose attribute value shows "TRUE" are selected and sorted in the descending order of the evaluation value, thereby deciding recommended programs. The result is shown in FIG. 10.

FIG. 10 is a diagram showing how the recommended programs in the category "travel" is displayed in a display apparatus connected to the program recommendation apparatus. As this drawing shows, program title, broadcast station, and broadcast date are displayed. In this drawing, all the four programs belonging to the category "travel" are displayed as recommended programs. In more detail, a threshold value is set with respect to the evaluation values of programs in advance, and only programs whose evaluation value is higher than the threshold value are recommended. In this example, the threshold set in advance is "1.00".

Figure 11:
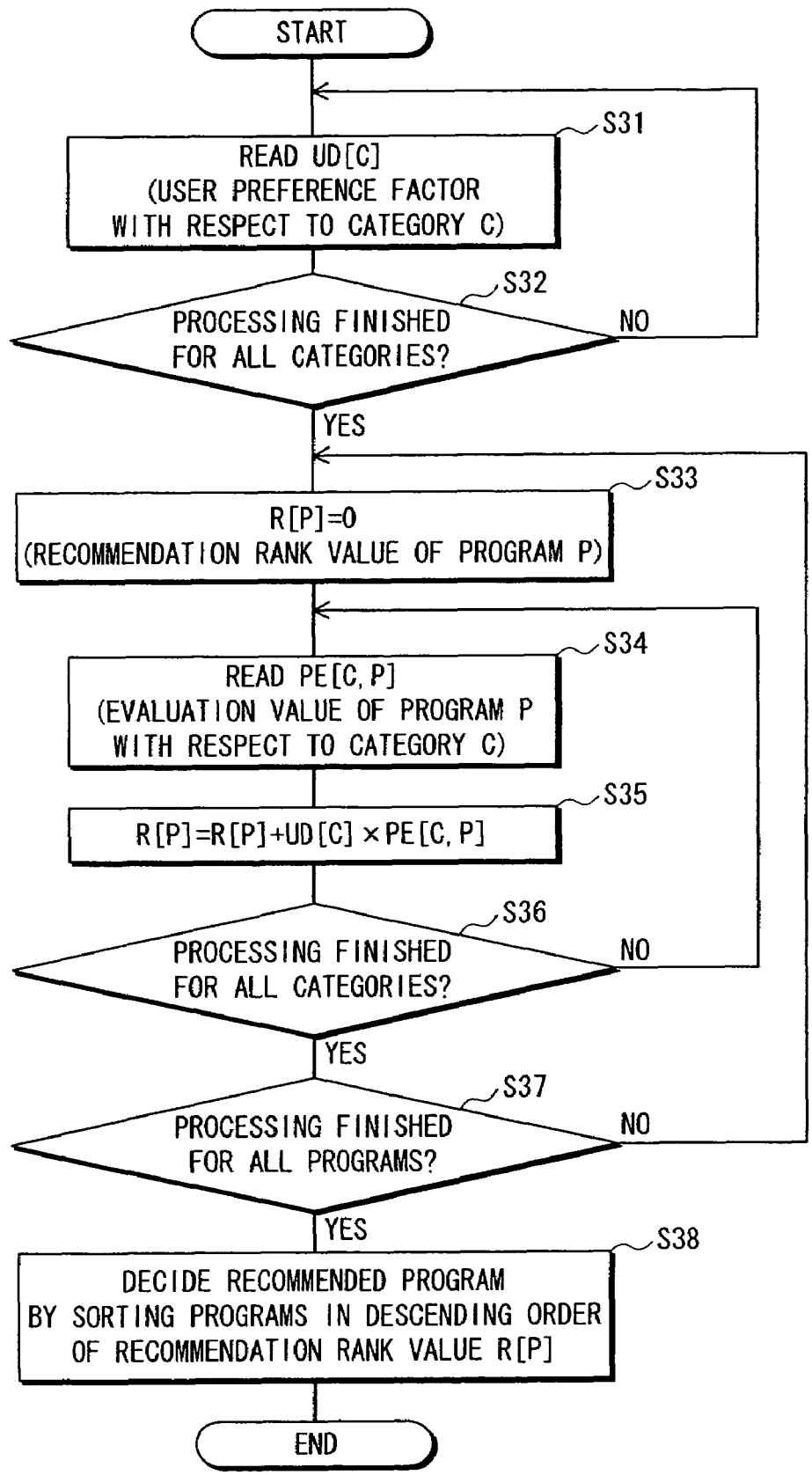
FIG. 11 is a diagram showing a flow of recommended program decision processing which does not distinguish between categories, performed by the program recommendation unit.

Next, a method of performing recommendation from all the programs (without making distinction of categories) is described with use of the flow shown in FIG. 11.

First, a user preference factor UD[C] for the category C is read (Step S31). Processing of Step S31 is performed to all the categories (Step S32). "0" is set as the recommendation rank value R[P] for the program P (Step S33). An evaluation value PE[C,P] of the program P with respect to the category C is read (Step S34). A value obtained by multiplying (UD[C]) and (PE[C,P]) is added to (R[P]) (Step S35). When processing from Step S34 to Step S35 is complete for all the categories (Step S36), and processing from Step S33 to Step S36 is complete for all the programs (Step S37), sorting of programs in the descending order of the recommendation rank values is performed, thereby deciding recommended programs.

FIG. 12 is a diagram showing recommendation rank values of programs, which are calculated in the above-described flow. The programs are sorted in the descending order of the recommendation rank values. Then the higher-rank programs are recommended to the user.

FIG. 13 is a diagram how a display apparatus connected to the program recommendation apparatus displays recommended programs selected based on the recommendation rank values for the programs described above with reference to FIG. 12. As shown in FIG. 13, program title, broadcast station, broadcast date, and category are displayed. Here, "Travel" is displayed as a category of the program "how to walk abroad". However the program also belongs to "gourmet" as shown in FIG. 5B. In the present embodiment, if one program belongs to a plurality of categories, the category having the highest evaluation values of the categories is selected as a representative. However, it is also possible to display all the plurality of categories that the program belongs to. In this drawing, all the six programs are displayed as recommended programs. In more detail, a threshold value is set with respect to a recommendation rank value, and only programs whose recommendation rank values are higher than the threshold value are recommended.

So far, calculation of an evaluation value and user preference factor of each program is performed using keywords and corresponding contribution factors registered in advance in the category dictionary. In the present invention, it is alternatively possible to update keywords in the category dictionary and their contribution factors for respective categories based on the user preference programs. According to the trend, some keywords in the program description of EPG cannot be found in the category dictionary created at the outset. This will cause a problem that a problem belonging to a category of a user's preference cannot be recommended because evaluation values of the problem for each category are unable to be calculated. On the contrary, there are keywords in the category dictionary that are no longer used in program description. It is a waste of memory if such obsolete keywords are left in the category dictionary. In view of this, it becomes necessary to consider the keywords in the category dictionary and their contribution factors on a regular basis.

Next, the processing performed by the keyword update unit 11 is described.

Using the flowcharts of FIGS. 14-17 respectively, the following describes keyword adding processing, keyword contribution factor update processing for a category of "user preference", keyword contribution factor update processing for other than the category of "user preference", and keyword deletion processing.

Figure 14:
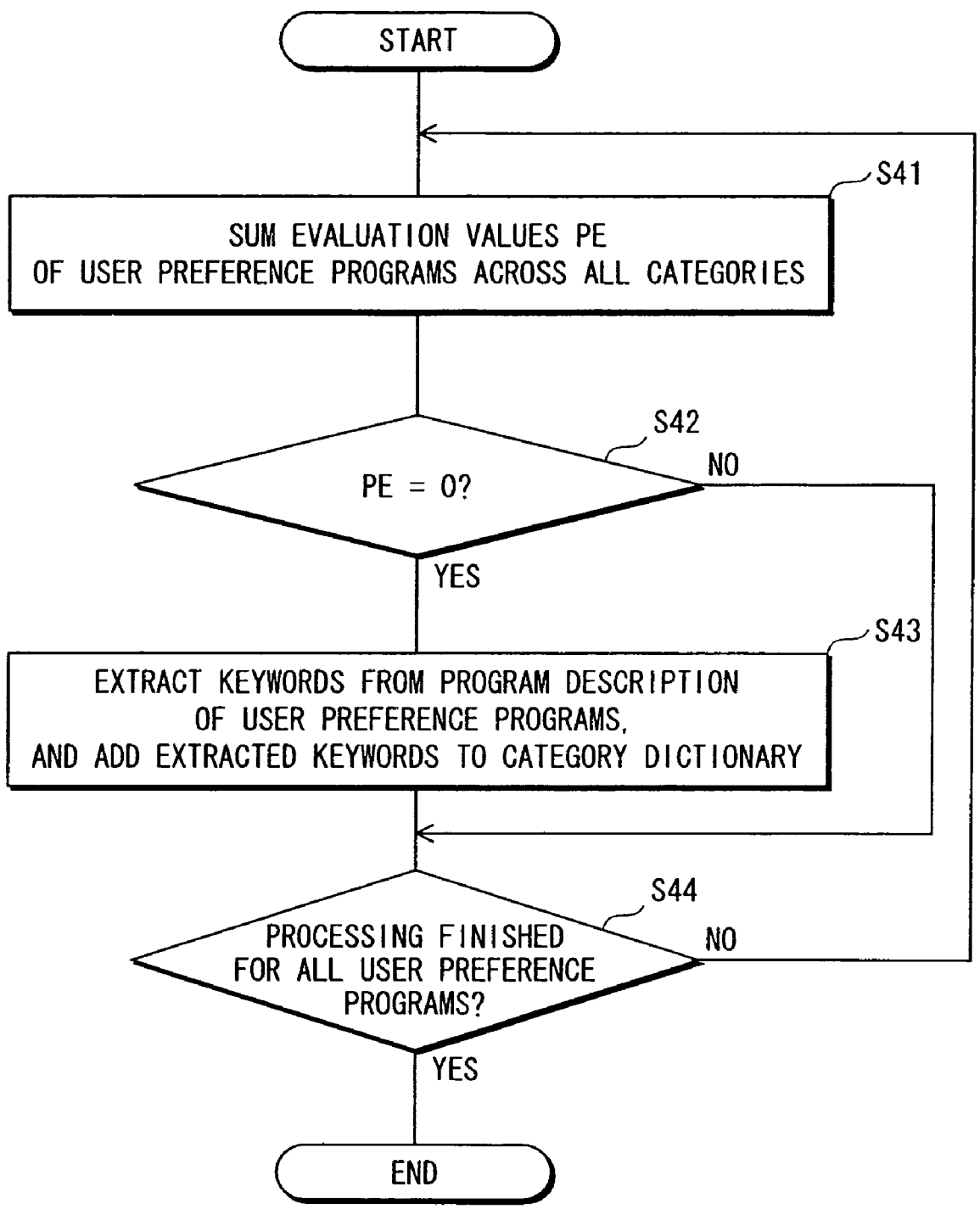
FIG. 14 is a diagram showing adding processing of keywords, performed by the keyword update unit.

First, the keyword adding processing is described using FIG. 14. For a target program from among the user preference programs, evaluation values with respect to the categories are read from the RAM 4. The evaluation values for all the categories are added together (Step S41). Then it is judged whether the total of evaluation values for all the categories is 0 or not (Step S42). If it is judged to be 0 (i.e. none of keywords in the program description of the target program shown by the EPG exists in the category dictionary), a noun dictionary stored in the RAM 4 is used to extract new keywords from the program description of the target program, and the extracted keywords are added to the category dictionary (Step S43). After ending of the processing to all the user preference programs (Step S44), the keyword adding processing ends.

Figure 15:
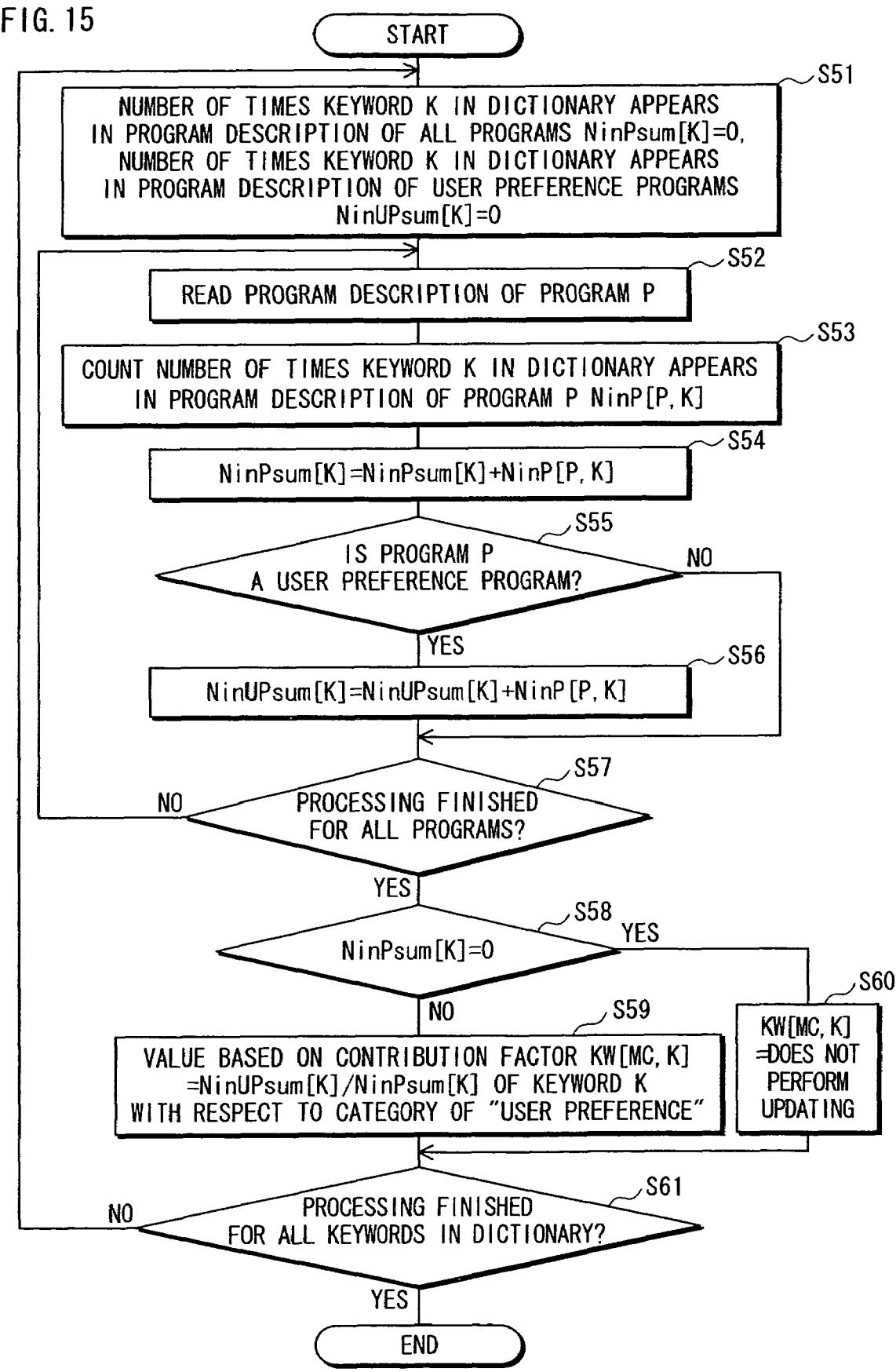
FIG. 15 is a diagram showing a flow of contribution factor update processing directed to a keyword with respect to a category of "user preference", performed by the keyword update unit.

Next, the keyword contribution update processing for a category of "user preference" is described using FIG. 15. Here, a category of "user preference" is defined as all the user preference programs stored in the RAM 4. Therefore each category of "user preference" is not related to any category into which programs are categorized by means of the category judgment unit 8. Contribution factor of keywords belonging to the category of "user preference" is subjected to processing for calculation of evaluation value and user preference factor, as in the case of other categories. In the initial stage where no keyword update has been performed yet, contribution factor of all the keywords is 0.00 in the category of "user preference", and so the category dictionary of FIG. 3 does not take into account this case. The following is an explanation of the flow.

First, the number of times (NinPsum[K]) the keyword K appears in the program description of all the programs is set as 0, and likewise, the number of times (NinUPsum[K]) the keyword K appears in the program description of the user preference programs is set as 0 (Step S51). Then the program description of the program P broadcast during a predetermined period in the past is read from the EPG (Step S52). The number of times (NinP[P,K]) the keyword K appears in the program description of the program P is counted (Step S53). This NinP[P,K] is added to NinPsum[K] (Step S54). Then, when the program P has turned out to be a user preference program (Step S55), NinP[P,K] is added to NinUPsum[K] (Step S56). Then, when the processing from Step S52 to Step S56 is complete for all the programs (Step S57), it is judged whether NinPsum[K] is 0 (Step S58).

When NinPsum[K] is not 0, a contribution factor KW[MC, K] of the keyword K with respect to the category of "user preference" MC is calculated by dividing NinUPsum[K] by NinPsum[K], and the obtained value is used to update the contribution factor KW[MC,K] in the category dictionary. (Step S59). When NinPsum[K] is 0 in Step S58, update of the contribution factor KW[MC,K] is not performed (Step S60). It is alternatively possible to update the contribution factor KW[MC,K] with the value "0". When the processing is complete for all the keywords in the category dictionary (Step S61), the update processing of keyword with respect to a category of "user preference" ends.

Figure 16:
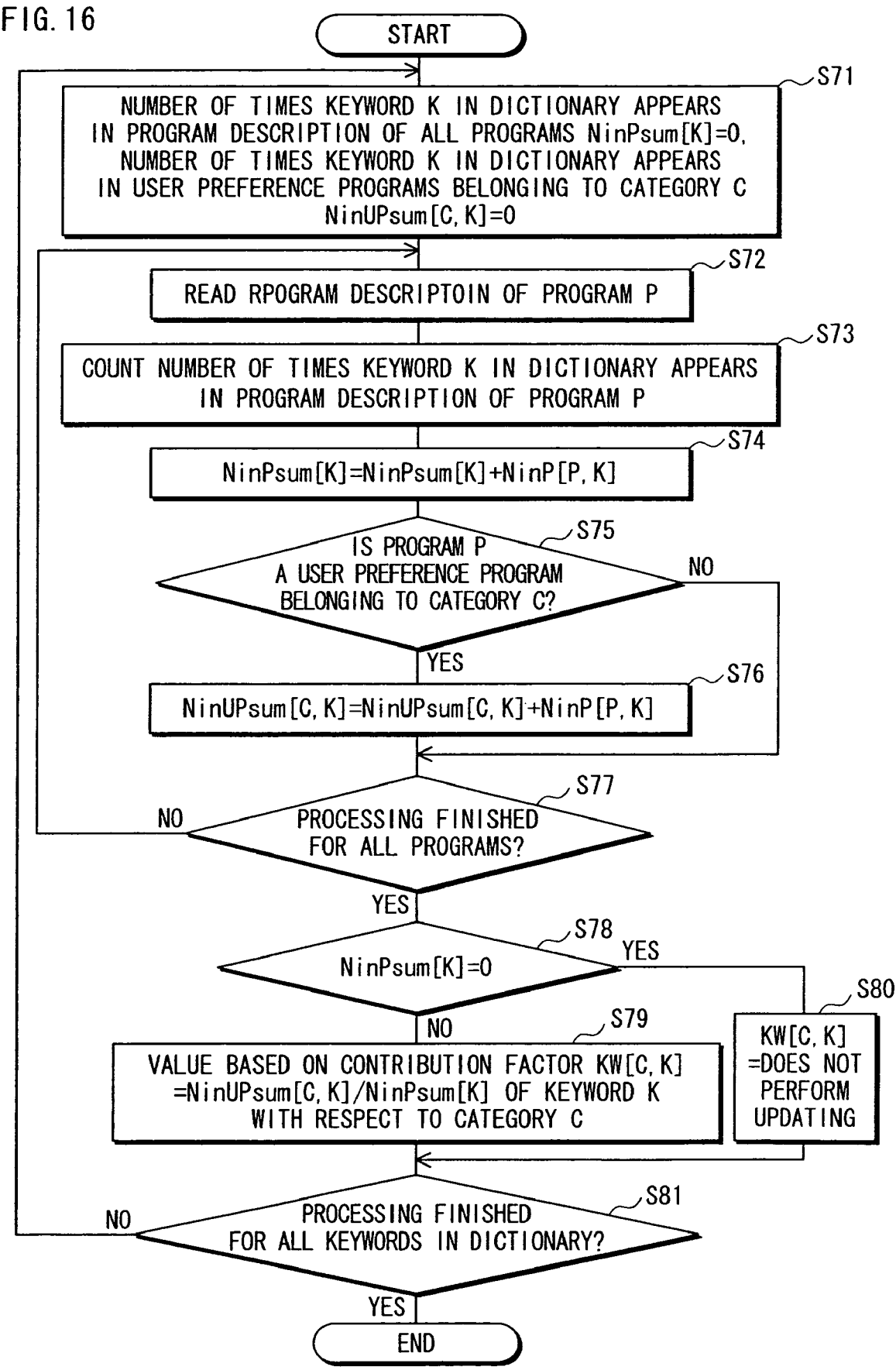
FIG. 16 is a diagram showing a flow of contribution factor update processing of a keyword with respect to other categories than the category of "user preference", performed by the keyword update unit.

Next, using FIG. 16, the flow of contribution factor update processing of keyword for categories other than the category of "user preference" is explained. Here, the explanation assumes that a category other than the category of "user preference" is the category C. First, NinPsum[K] is set as 0; and likewise, the number of times (NinUPsum[C,K]) the keyword K appears in the program description of user preference programs belonging to the category C is set as 0 (Step S71). The program description for the program P during a predetermined period in the past is read from the EPG stored in the RAM 4 (Step S72). The number of times (NinP[P, K]) the keyword K appears in the program description of the program P is counted (Step S73). NinP[P,K] is then added to NinPsum[K] (Step S74). When the program P has turned out to be a user preference program (Step S75), NinP[P,K] is added to NinUPsum[C,K] (Step S76). When the processing from Step S72 to Step S76 is complete for all the programs (Step S77), it is then judged whether the NinPsum[K] is 0 or not (Step S78). When NinPsum[K] is not 0, NinUPsum[C,K] is divided by NinPsum[K], thereby obtaining a contribution factor (KW[C,K]) of the keyword K with respect to the category C, and the obtained value is used to update KW[C,K] in the category dictionary (Step S79). When NinPsum[K] is 0 in Step S78, update of the contribution factor KW[MC,K] of the keyword K with respect to the category C is not performed (Step S80). It is alternatively possible to set the contribution factor as 0. When the processing is complete for all the keywords in the category dictionary (Step S81), the keyword contribution factor update processing for the category other than the category of "user preference" ends.

Figure 17:
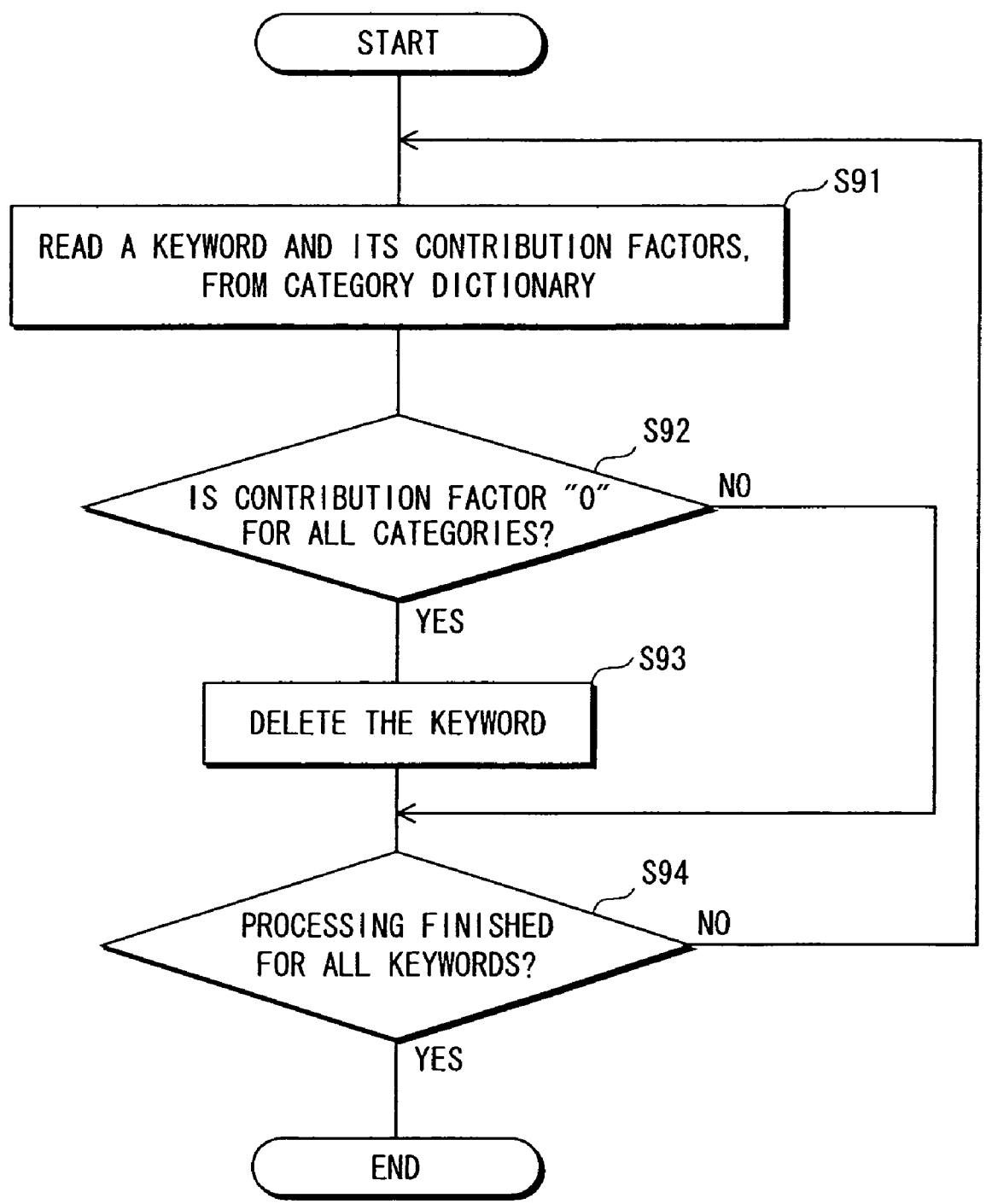
FIG. 17 is a diagram showing a flow of deletion processing of a keyword, performed by the keyword update unit.

Next, the flow of keyword deletion processing shown in FIG. 17 is explained. First, a keyword and its contribution factor with respect to each category are read from the category dictionary (Step S91). When the contribution factor is 0 for all categories (Step S92), the keyword is deleted from the category dictionary (Step S93). When the processing is complete for all the keywords (Step S94), the keyword deletion processing ends.

Next, the keyword adding processing, the contribution factor update processing, and the keyword deletion processing, which are performed by the keyword update unit 11 and are described above, are explained by way of a concrete example.

FIG. 18 is a diagram showing the contents of the category dictionary, which is excerpted from the category dictionary of FIG. 3.

FIG. 19 is a diagram showing which keywords are included in the program description of each of the programs A to E, as well as showing which program is a user's preferred program. Here, from "program A" to "program E" corresponds to all the programs during a predetermined period in the past in the EPG stored in the RAM 4. These programs are judged as being user preference programs if they are stored in the RAM 4 as user preference programs. As shown in this drawing, each of the program descriptions for "program A", "program B", "program C", and "program D" includes a keyword "market". However, the category dictionary shown in FIG. 18 does not include the keyword "market".

Figure 4:
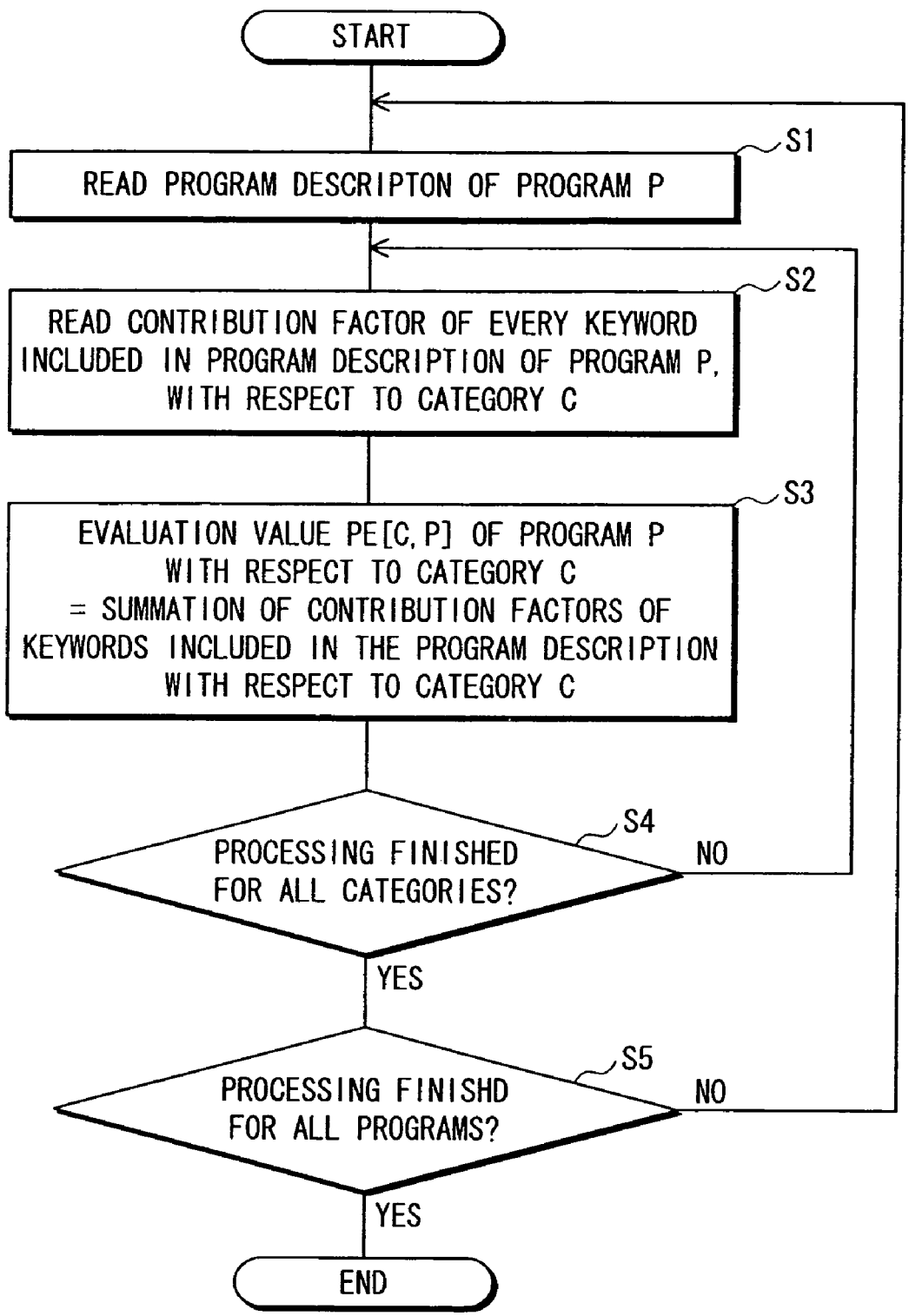
FIG. 4 is a diagram showing a flow showing processing for calculating evaluation values of each program with respect to each category, performed by an evaluation value calculation unit.

FIG. 20A is a diagram showing the result of calculation of evaluation value of each program for each category performed in accordance with the flow of FIG. 4. FIG. 20B is a diagram showing the result of categorization of programs using evaluation value of each program for each category and a threshold value of 0.50. The program description of "program D" only includes a keyword of "market" which does not exist in the category dictionary. Therefore, the evaluation value of the program D for all the categories is 0.00. Therefore the keyword "market" is added to the category dictionary.

Next, a calculation method of the contribution factor of the keyword "market" is described. First, the case of category of "user preference" is described. The contribution factor of a keyword is calculated by dividing the number of the keyword in all the user preference programs by the number of the keyword in all the programs. Here, the number of the keyword in all the programs is 3, and the number of the keyword in the user preference programs is 2, and therefore the contribution factor of the keyword "market" to the category of "user preference" is calculated as 0.67.

Next, the case of a category other than the category of "user preference" is described. In the case of a category other than the category of "user preference", the contribution factor of a keyword is calculated by dividing the number of the keyword in user preference programs belonging to a target category by the number of the keyword in all the programs. Since the number of the keyword in the user preference programs belonging to the target category of "travel" is 0, the contribution factor of the keyword "market" to the category "travel" is calculated as 0.00. The number of the keyword "market" in the categories of "gourmet" and "cooking" is respectively 1, the contribution to the categories of "gourmet" and "cooking" is respectively 0.33. The same method is used for other keywords to calculate corresponding contribution factors.

FIG. 21A shows the result of contribution factor update performed to all the keywords. According to this result, every keyword whose contribution factor to all the categories is 0.00 is deleted from the category dictionary. The deletion result is shown in FIG. 21B.

By regularly updating keywords in the category dictionary in the above way, it becomes possible to avoid a case where a program, which belongs to the category that a user would prefer, is not recommended to the user for a reason that the evaluation value for each category could not be obtained.

<Notes>

So far, the program recommendation apparatus relating to the present invention is described based on the first embodiment. Needless to say, however, the present invention should not be limited to the examples described above, and partial modification directed to the program recommendation apparatus can be performed. For example, the following modifications are possible.

(1) In the first embodiment, only noun is shown as an example of keyword registered in a category dictionary, but the present invention is not limited to such a structure. Verb and adjective can also be keywords.

(2) In the first embodiment, the keyword search is performed directed to a program description in an EPG, but the present invention is not limited to such a structure. For example, the keyword search may also be directed to other items of an EPG such as program title, cast, genre.

(3) In the first embodiment, user preference programs are selected programs from an EPG, which a user finds interesting after watching, and record-preset programs found in record presetting history of an external recording apparatus connected to the program recommendation apparatus. However, needless to say, the present invention is not limited to such a structure. Other structures are also possible, for example, in which programs that a user has watched on an external television, connected to the program recommendation apparatus, are considered as user preference programs, and in which only played back programs among the record-preset programs are considered as user preference programs. These structures are concretely realized by providing, for a program recommendation apparatus, a first playback history obtaining unit for obtaining a first playback history relating to programs played back on a television; a second playback history obtaining unit for obtaining a second playback history relating to programs played back on a recording apparatus; a playback judgment unit for judging, by referring to the second playback history obtained by the second playback history obtaining unit, whether the programs in the second playback history exist in record presetting history. The first playback history and information showing programs selected from the EPG are directly stored in the user preference programs storage area of the RAM 4. The record presetting history is temporarily stored in a different area of the RAM 4. A history relating to played back programs is obtained from the second playback history obtaining unit and then is checked against the record presetting history read by the playback judgment unit. As a result, only programs that exist in the record presetting history and that are judged to have been played back are stored in the user preference program storage area of the RAM 4.

(4) In the first embodiment, the program recommendation apparatus itself does not have a display function or a recording function relating to an EPG and a recommended program, and so has to connect to such audio-visual apparatuses as a television and a recording apparatus for the purpose of realizing such functions. However, needless to say, the present invention is not limited to such a structure, and may be an apparatus into which functions of a television, a recording apparatus, and a program recommendation apparatus are integrated.

(5) In the method of category analysis according to the first embodiment, a user preference factor is a ratio of the total number of evaluation values of a corresponding category in relation to the total number of evaluation values of all categories. However, the present invention is not limited to such a structure. For example, a user preference factor may be a ratio of user preference programs belonging to a corresponding category in relation to the entire user preference programs, or may be a ratio of the total number of evaluation values of user preference programs for a corresponding category in relation to the total number of evaluation values of all programs for the category. Still alternatively, a user preference factor may be a ratio of user preference programs in relation to programs within a corresponding category.

(6) In the screen display of the first embodiment, a user preference factor is displayed in form of bar graphs. However, needless to say, the present invention is not limited to such a structure. For example, circle graphs may be used. Modification of user preference factor should not be limited to be performed through an operation received through an input unit provided for a front panel of a program recommendation apparatus or through a remote controller. For example, it is possible to realize such modification of user preference factor, by a click operation or a drag operation received through a keyboard, a touch panel, a mouse, a pad, a truck ball, and so on.

(7) In the method of recommending programs for each category explained in the first embodiment, any program whose user preference factor exceeds a preset threshold value is recommended. However, needless to say, the present invention should not be limited to such a structure. For example, programs belonging to a category whose user preference factor is the largest may be recommended.

(8) In the recommendation method from each category explained in the first embodiment, firstly, programs within the category "travel" are recommended in the descending order of evaluation values. However, needless to say, the present invention is not limited to such a structure. For example, a structure is possible in which recommendation rank values are calculated as in the case of recommending programs regardless of categories, and then programs are recommended according to the calculation result. Specifically in such a structure, the recommendation rank value of each program is calculated by multiplying an evaluation value of each category and corresponding user preference factor, and then the multiplication results are summed for all the categories thereby obtaining recommendation rank values of the programs, and then programs having high recommendation rank values are recommended from among programs belonging to the category "travel".

(9) In the first embodiment, a threshold value is set with respect to the evaluation values of programs, in proportion to the number of programs to be recommended according to categories, and only programs having higher evaluation value than the threshold value are recommended. However the present invention is not limited to such a structure. For example, the number of programs to be recommended within a category may be calculated by multiplying the number of programs belonging to the category and user preference factor of the category.

Alternatively, it is also possible to set the number of programs to be recommended within a category, as a value obtained by multiplying 1) the number of recommended programs, which is given, and 2) a ratio of user preference factor of the category to user preference factors of all the categories.

(10) In the first embodiment, in the explanation regarding the keyword adding processing performed by the keyword update unit 11, nouns included in the noun dictionary stored in the RAM 4 are extracted from the program description as keywords. However needless to say, the present invention is not limited to such a structure. For example, verbs and adjectives may also be extracted as keywords, using a dictionary containing verbs and adjectives.

(11) Information processing by means of programs shown in FIGS. 4, 6, 8, 11, and 14-17 is concretely realized by using hardware resources such as a CPU and a RAM. Therefore, the programs may respectively constitute an invention. The first embodiment describes the case where the programs are incorporated in the program recommendation apparatus, but the programs in the first embodiment can be used independently of the program recommendation apparatus. However, each program in the first embodiment may be used independently from the program recommendation apparatus. Acts of executing the programs include (1) an act of producing, (2) an act of transferring with or without charge, (3) an act of renting, (4) an act of importing, (5) an act of providing for the public via a bi-directional electronic communications network, and (6) an act of offering for transfer or rent using storefront displays, catalogs, or pamphlets.

One example of the above-described type (5) that uses a bi-directional electronic communication network is a function-providing type ASP service. The function-providing type ASP service, only the functions of the program is provided to a user via the electronic communication network, while the program is left in the provider's hand.

Second Embodiment

Figure 22:
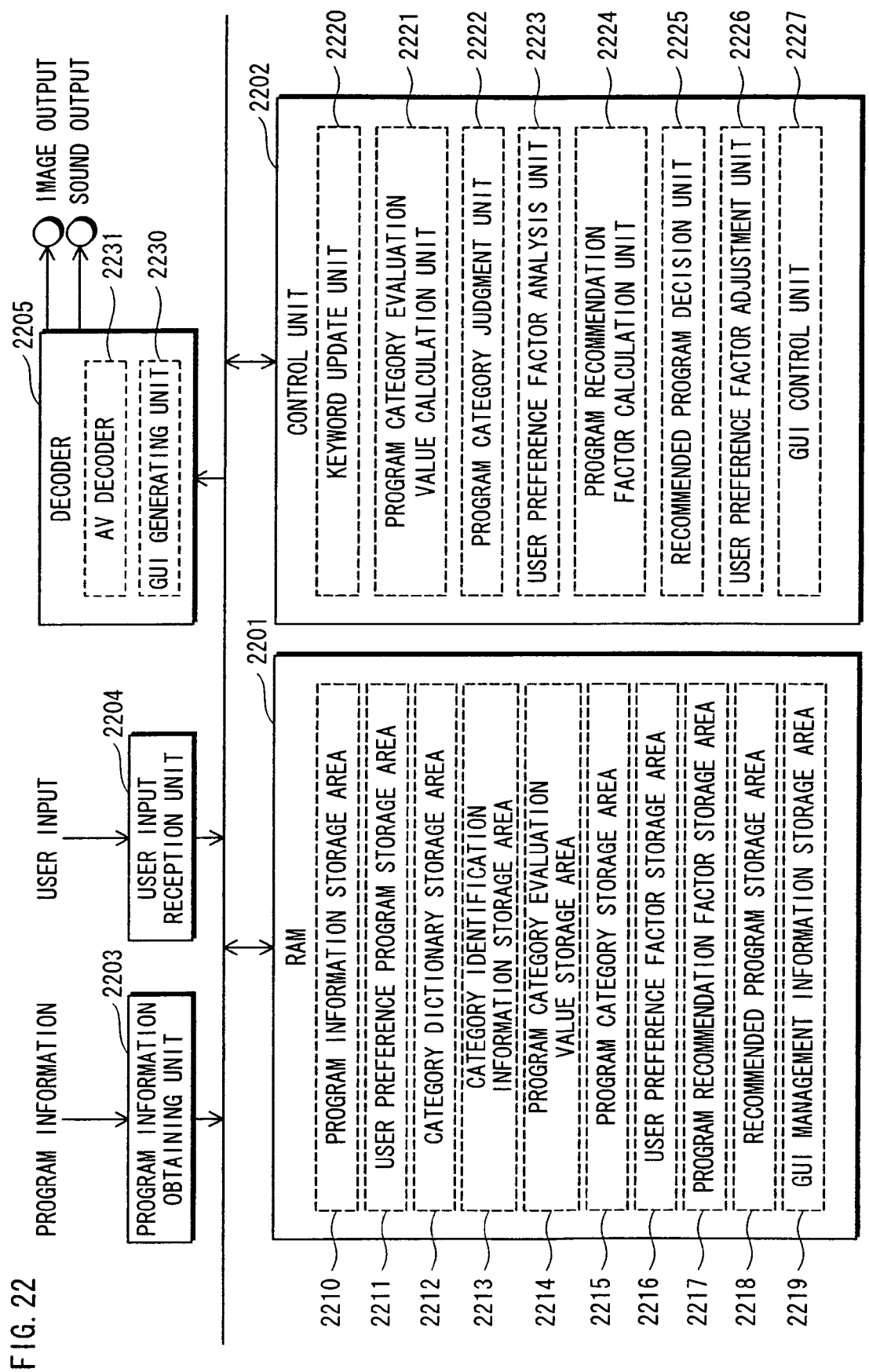
FIG. 22 is a structural diagram showing a second embodiment of a program recommendation apparatus relating to the present invention.

FIG. 22 is a diagram showing a structure of a second embodiment of a program recommendation apparatus relating to the present invention. This program recommendation apparatus is comprised of a RAM 2201, a control unit 2202, a program information obtaining unit 2203, a user input reception unit 2204, and a decoder 2205.

The RAM 2201 includes a program information storage area 2210 for storing program information that the program information obtaining unit 2203 has obtained, a user preference program storage area 2211, a category dictionary storage area 2212, a category identification information storage area 2213, a program category evaluation value storage area 2214, a program category storage area 2215, a user preference factor storage area 2216, a program recommendation factor storage area 2217, a recommended program storage area 2218, and a GUI management information storage area 2219.

The control unit 2202 is a CPU unit, and is comprised of a keyword update unit 2220, a program category evaluation value calculation unit 2221, a program category judgment unit 2222, a user preference factor analysis unit 2223, a program recommendation factor calculation unit 2224, a recommended program decision unit 2225, a user preference factor adjustment unit 2226, and a GUI control unit 2227.

The decoder 2205 includes a GUI generating unit 2230 and an AV decoder 2231.

The constituting parts that are common to those of the first embodiment are not described in detail in the following. Only the constituting parts that are unique to the second embodiment are detailed below.

The program information storage area 2210 corresponds to an EPG storage area of the RAM 4 in the first embodiment, and stores therein program information.

The user preference program storage area 2211 stores therein programs that a user has watched in the past, as user preference programs. In the first embodiment, the record-presetting history obtaining unit 3 obtains a record-presetting history and stores information identifying the programs listed in the record-presetting history, as user preference programs. However in the present embodiment, the user input reception unit 2204 is designed to store each program that a user has watched as a user preference program. Note that user preference programs are stored for each user. For example, when the user input reception unit 2204 has received selection of one program by means of channel selection using a television remote controller or after displaying program information, the user input reception unit 2204 also receives input of information identifying the user. When the user is "Taro", an already defined identifier "1" is received, and when the user is "Hanako", the defined identifier "2" is received. Information identifying the programs is stored for each of these identifiers.

The category dictionary storage area 2212 stores therein a category dictionary.

FIG. 23 shows an example of a category dictionary. The category dictionary 2301 has a list of a plurality of words found in the program information as keywords 2302, each of which is assigned a contribution factor 2303 with respect to each category. The categories are broad classification of programs and can precisely distinguish programs by combination among them.

Here, when a keyword is a general word, the assigned contribution factor 2303 indicates a small value, and when a keyword is a special word having strong connection with a category, the assigned contribution factor 2303 indicates a large value.

The category identification information storage area 2213 stores category identification information that visually identifies each category.

FIG. 24 is a diagram showing one example of category identification information. In the category identification information 2401, colors 2403 respectively identify the categories 2402. For example, in displaying program information, programs are broadly classified into the categories. Then each program is displayed in the program column in the background having a corresponding one of the colors 2403. In addition, when a program has a keyword assigned a large contribution factor, the explanation of the program is displayed in the color associated with the keyword.

In the above-described example, the categories are respectively displayed in different colors. However, the display manner is not limited to such a structure as long as the categories are visually distinguishable from each other. For example, the font may be varied for each category.

The program category evaluation value storage area 2214 corresponds to the evaluation value storage area in the first embodiment, and stores therein program category evaluation value.

FIG. 25 is a diagram showing one example of the program category evaluation value. The program category evaluation value 2501 is a list of evaluation values 2503 respectively for the programs 2502. Here, the evaluation values 2503 respectively indicate contribution factor of keywords included in program information for each category.

Program categories are stored in the program category storage area 2215.

FIG. 26 is a diagram showing one example of program categories. A program category 2601 includes broadly defined categories 2603 for the programs 2602. Here, each category 2603 corresponds to a category whose evaluation value 2503 is the largest for a corresponding one of the programs 2502 in the category evaluation value 2501.

The user preference factor storage area 2216 stores therein user preference factor indicating each user's preference tendency. As shown in FIG. 27, the user preference factor 2701 is a percentage representation of the preference factor 2703 for the categories of programs that the user has watched (i.e. for each of the programs stored in the user preference program storage area 2211). Note that this user preference factor corresponds to the user preference factor shown in FIG. 7 of the first embodiment described above.

The program recommendation factor storage area 2217 stores therein recommendation factor for programs displayed in the program table currently in display on a currently-connected television screen, or the like.

FIG. 28 is a diagram showing one example of recommendation factor. In the recommendation factor 2801, recommendation factor 2804 for programs 2803 are listed for each user 2802. Here, the recommendation factor is represented by a numerical value with a maximum being the total number of categories. As the numerical value gets larger, it indicates that the program matches the user's preference more. Here, the total number of categories is set as "5". The calculation method for this recommendation factor is detailed later.

The recommended program storage area 2218 stores therein programs recommended to a user.

The GUI management information storage area 2219 stores therein a template for visualizing a program table and a user preference factor.

Figure 29:
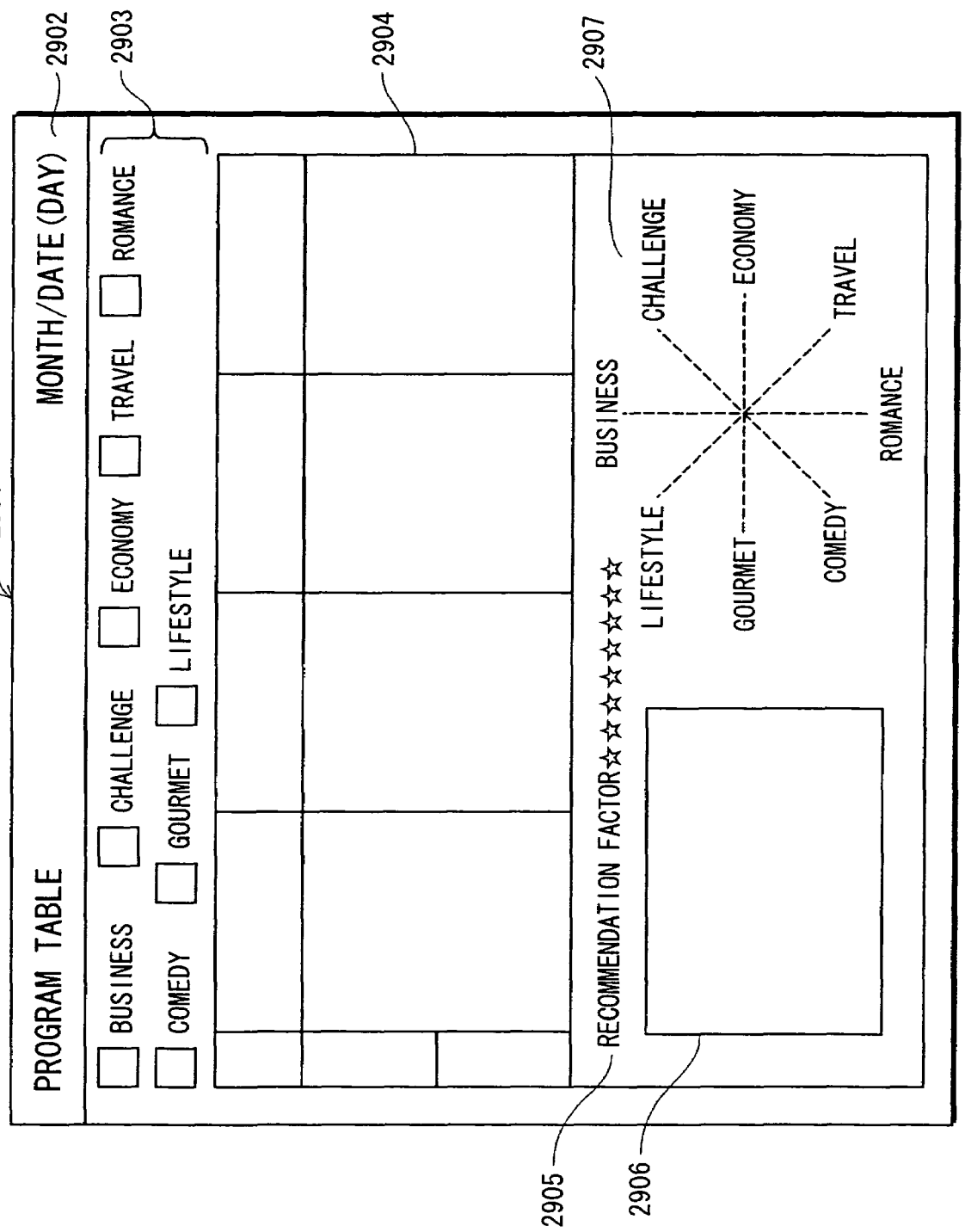
FIG. 29 is a diagram showing one example of template for displaying a program table stored in a GUI management information storage area of the above-stated embodiment.

FIG. 29 is a diagram showing one example of the template for displaying a program table. The template 2901 includes: a display area for broadcast date of the corresponding program; category identification information 2903; a program-table display area 2904; a recommendation factor of a specified program 2905; and a program description column 2906; and a radar-graph area 2907.

The category identification information 2903 indicates color that the category identification information 2401 shows, however nothing is shown in the boxes in this particular diagram.

The program-table display area 2904 is for displaying program information read from the program information storage area 2210.

The recommendation factor 2905 is represented by the number of black stars. In the template, white stars are displayed in the number corresponding to the number of categories.

The program description column 2906 is for displaying detailed introductory description of a selected program.

In the radar-graph area 2907, only the axes respectively corresponding to the categories are illustrated. In this radar graph area 2907, standardized values of the user preference factor 2701 and of the category evaluation value 2501 are shown in form of graphs.

Figure 30:
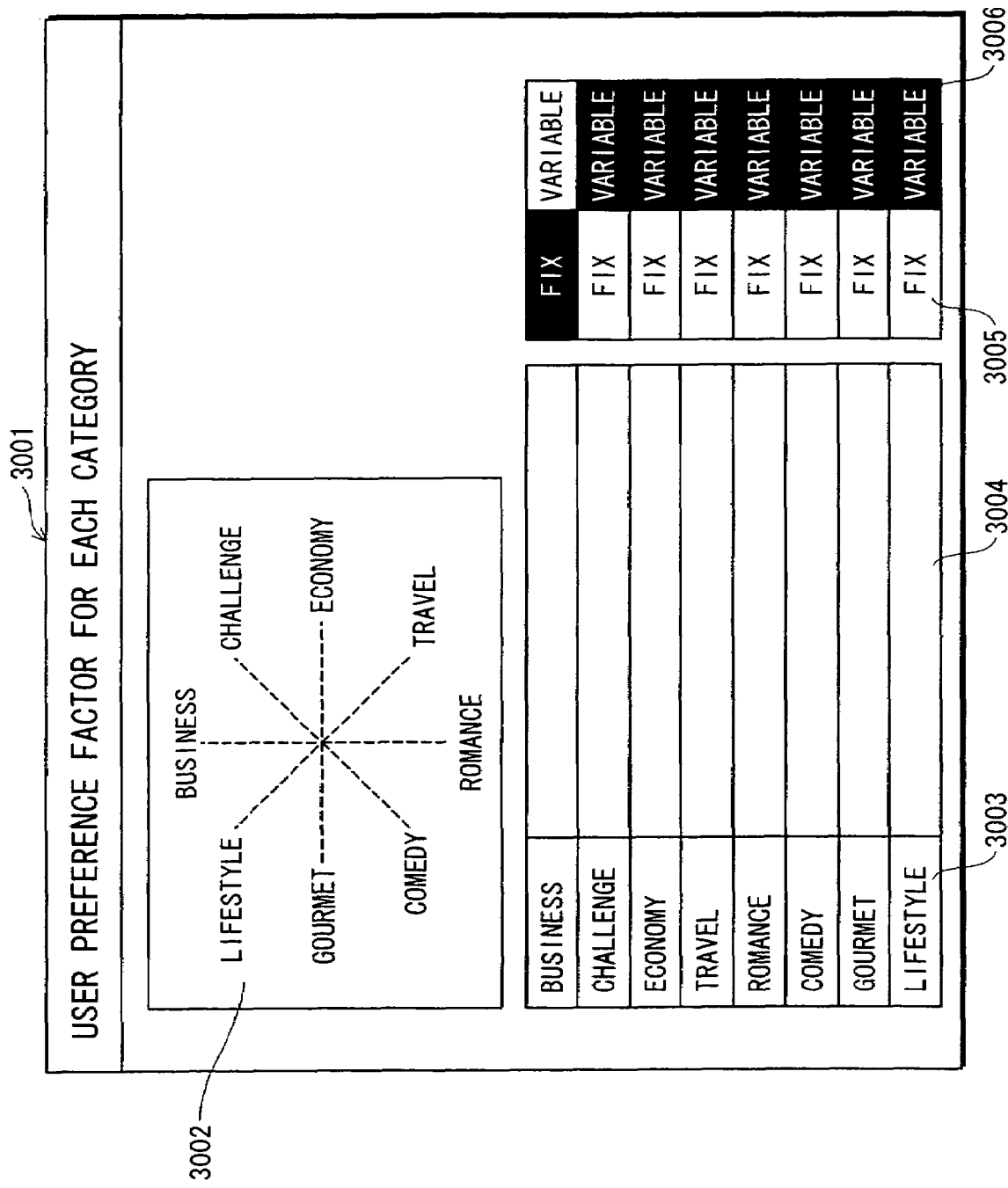
FIG. 30 is a diagram showing one example of template for displaying user preference factor stored in the GUI management information storage area of the above-stated embodiment.

FIG. 30 shows a template for displaying a user preference factor. The template 3001 includes axes respectively corresponding to categories in the radar graph 3002, the display area 3004 for displaying bar graphs each corresponding to the categories 3003, "fix" buttons 3005 and "variable" buttons 3006 for each of the bar graphs.

The control unit 2202 performs each processing operation according to each program stored in a ROM not illustrated in the drawing.

The keyword update unit 2220 corresponds to the keyword update unit 11 in the first embodiment described above.

The keyword update unit 2220 selects, from among the programs stored in the user preference program storage area 2211, every program for which a summation of all category evaluation values for the categories found in the program category evaluation value storage area 2214 is "0", and reads program information corresponding to the selected programs from the program information storage area 2210. Then, the keyword update unit 2220 extracts words included in there ad program information using a noun dictionary, for example, and registers the extracted words in the category dictionary storage area 2212 as keywords.

Next, the following processing is performed so as to assign contribution factor to the registered keywords.

Here, suppose that a word "W" was extracted as a keyword. The keyword update unit 2220 obtains program information for all the programs broadcast in a predetermined period from the current time point (e.g. in the past month), and counts how many times the word "W" has appeared. For example, the word "W" is assumed to have appeared 10 times (AT=10). Next, information on which category each of the programs is categorized into in the program category storage area 2215 is obtained. For example, it is assumed that there are three programs categorized into the category A. Then it is counted how many times the word "W" appears in the program information of the three programs. Here, it is assumed that the word "W" has appeared seven times (AC=7). In this case, the contribution factor of the word "W" with respect to the category A is calculated as AC/AT=0.7. This contribution factor 0.7 is registered in the category dictionary storage area 2212 as a contribution factor of the newly-added word "W" with respect to the category A. If the word "W" does not appear even once in the program information of every program categorized in the category B, then AC=0. Accordingly, the contribution factor of the word "W" with respect to the category B will be registered as "0".

The program category evaluation value calculation unit 2221 and the program category judgment unit 2222 respectively correspond to the evaluation value calculation unit 7 and the category judgment unit 8 of the first embodiment.

The user preference factor analysis unit 2223 obtains a preference factor for each category of programs that a user has watched (stored in the user preference program storage area 2211) based on the program category evaluation value 2501 calculated by the program category evaluation value calculation unit 2221. The obtained user preference factor 2701 is recorded in the user preference factor storage area 2216.

Note that in the first embodiment, only one user is assumed to use the program recommendation apparatus of the present invention, and so distinction among users is not taken into consideration. However, the present embodiment is designed to recognize a user who is watching a program via the user input reception unit 2204, and obtains a user preference factor for each user.

The program recommendation factor calculation unit 2224, while a program table is displayed by the GUI control unit 2227, calculates a recommendation factor based on a degree of similarity between the program category evaluation value of a displayed program, which is stored in the program category evaluation value storage area 2214, and the preference factor of a user who instructs to display the program table. The calculated recommendation factor is stored in the program recommendation factor storage area 2217.

FIG. 31 shows a concrete example in which a program's category evaluation factor and user preference factor are shown for the purpose of obtaining a recommendation factor. Here, the program category evaluation value 3101 is a standardized version of the evaluation value 2503 in FIG. 25, so as to fall in the range of 0.0 to 1.0, inclusive. Likewise, the user preference factor 3102 is a standardized version of the user preference factor 2701 of FIG. 27 shown in percentage representation, so as to fall in the range of 0.0 to 1.0, inclusive.

The recommendation factor R is calculated using the following equation (1).

$$\text{Recommendation factor } R = N - \sum_{i=1}^{N} |\text{category evaluation value for category } N - \text{user preference factor of category } N| \quad \text{Equation (1)}$$

In this equation, "N" signifies the total number of categories. In FIG. 31, it corresponds to "5" (i.e. Category E to Category A).

As shown below, the program recommendation factor calculation unit 2224 calculates the recommendation factor R for Taro and Hanako respectively, using the equation (1).

The user Taro's recommendation factor R for the program X is calculated as follows.

$R=5-(|1.0-1.0|+|0.0-0.0|+|0.1-0.3|+|0.9-0.8|+|1.0-1.0|)=5-(0+0+0.2+0.1+0)=5-0.3=4.7$

The user Hanako's recommendation factor R for the program X is calculated as follows.

$R=5-(|1.0-0.0|+|0.0-1.0|+|0.1-1.0|+|0.9-0.0|+|1.0-1.0|)=5-(1.0+1.0+0.9+0.9+0)=5-3.8=1.2$

From these calculation results, the recommendation factor R of the program X is 4.7 for Taro, and is 1.2 for Hanako. The result shows that the program X has category evaluation value very similar to the preference of Taro, and so matches Taro's preference, but does not match Hanako's preference.

The recommended program decision unit 2225 decides a program having high recommendation factor, from among the programs stored in the program recommendation factor storage area 2217, as a recommended program. Note that the recommended program decision unit 10 in the first embodiment can also be designed to decide, as a recommended program, a program having high recommendation factor R that is calculated by the program recommendation factor calculation unit 2224 of the present embodiment. In this case, the program recommendation factor calculation unit 2224 should not only calculate a recommendation factor R for a specified program, but also calculate recommendation factor for the programs shown in the program information.

The user preference factor adjustment unit 2226 receives initial setting and modification setting of user preference factor, from a user via the user input reception unit 2204. The user preference factor adjustment unit 2226 then adjusts the user preference factor 2701 stored in the user preference factor storage area 2216.

In the user preference factor 2701 of the above-described example, the user preference factor 2703 is calculated for each category, using programs that a user has watched in the past. Therefore at the outset of introduction of the program recommendation apparatus, the user preference factor is not obtained yet. Therefore, user's likes and dislikes for the categories are directly received from the user, and are stored in the user preference factor storage area 2216 as the preference factor.

The present apparatus enables user preference factor to be obtained by the user preference factor analysis unit 2223. Also when a user would like to modify the stored user preference factor, the present apparatus enables such modification.

Initial setting is performed as follows. First, the template 3001, of FIG. 30 is displayed. After "variable" buttons 3006 are set for all the categories 3003, bar graphs are drawn for all the categories in the bar-graph display area 3004. Then the "variable" buttons 3006 are changed to "fixed" buttons 3005. In this way, it becomes possible to set the user preference factor for the categories in accordance with a user's intention.

Figure 32:
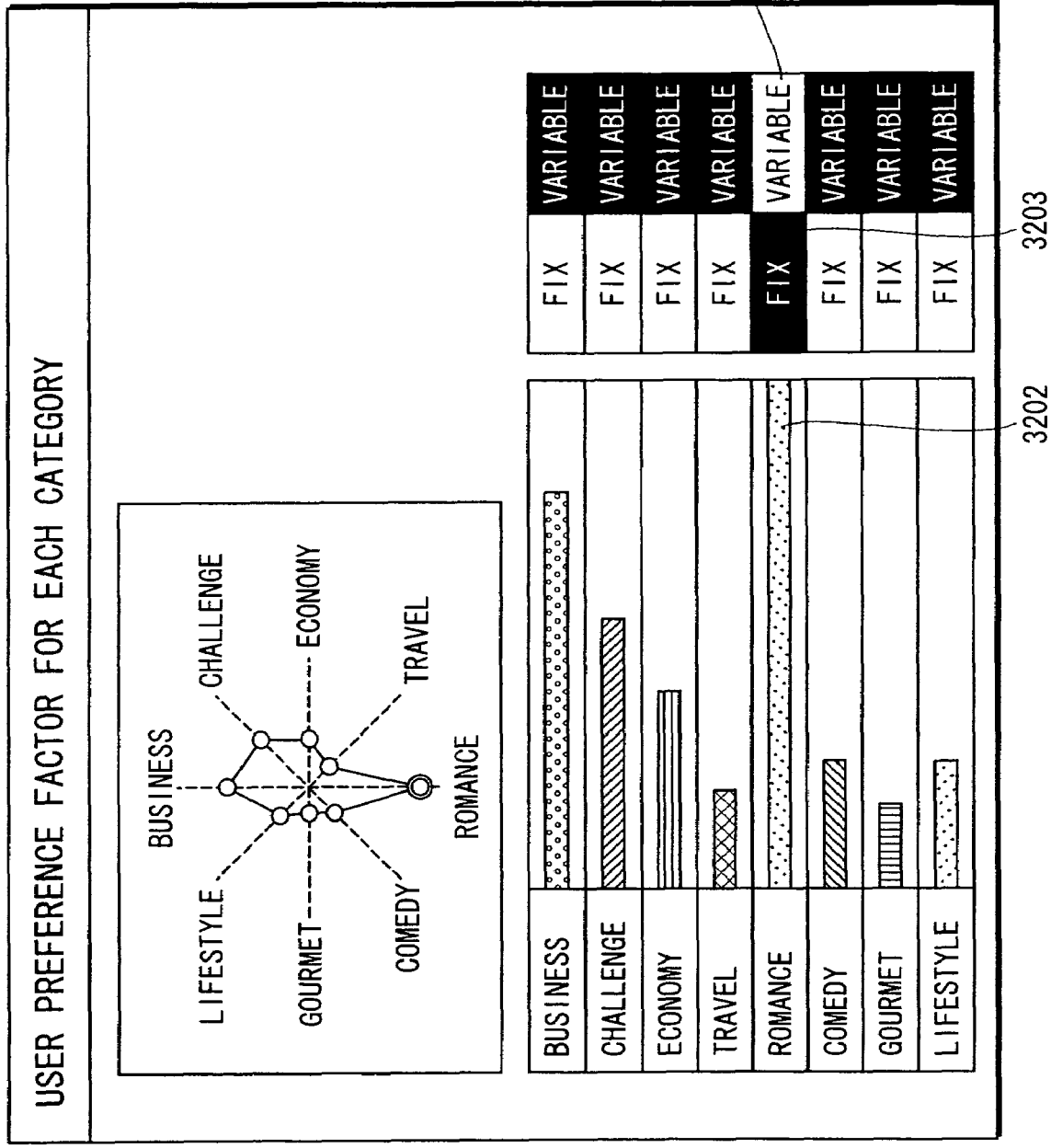
FIG. 32 is a diagram showing a display example of user preference factor analyzed by the user preference factor analysis unit of the above-stated embodiment, which the GUI control unit has displayed.

Modification is performed as follows. The user preference factor currently stored in the user preference factor storage area 2216 are displayed as shown in FIG. 32. Then, setting of "variable" button 3201 is performed for a category that he wants to modify, and the corresponding bar graph 3202 is either extended or shortened, then the "variable" button 3201 is changed to "fixed" button 3203. The user preference factor adjustment unit 2226 records the preference factor for the category after the modification in the user preference factor storage area 2216, in accordance with the length of the bar graph after the modification.

The GUI control unit 2227 displays on a television screen to which the present apparatus is connected, a recommended program, a program table, and a recommendation factor of a specified program, and performs various other displays for setting/modifying of user preference factor for example. The details thereof are given later.

The program information obtaining unit 2203 has the same structure as the EPG obtaining unit 2 in the first embodiment.

Likewise, the user input reception unit 2204 corresponds to the input reception unit 1. The user input reception unit 2204, when a program is in selected state, receives input as to which user is watching the program, and notifies the user preference factor analysis unit 2223 of the user. This enables analysis of user preference factor for each user, as well as enabling program recommendation for each user.

The GUI generating unit 2230 generates a display screen by means of a control performed by the GUI control unit 2227.

The AV decoder 2231 outputs videos included in the display screen generated by the GUI generating unit 2230.

Figure 33:
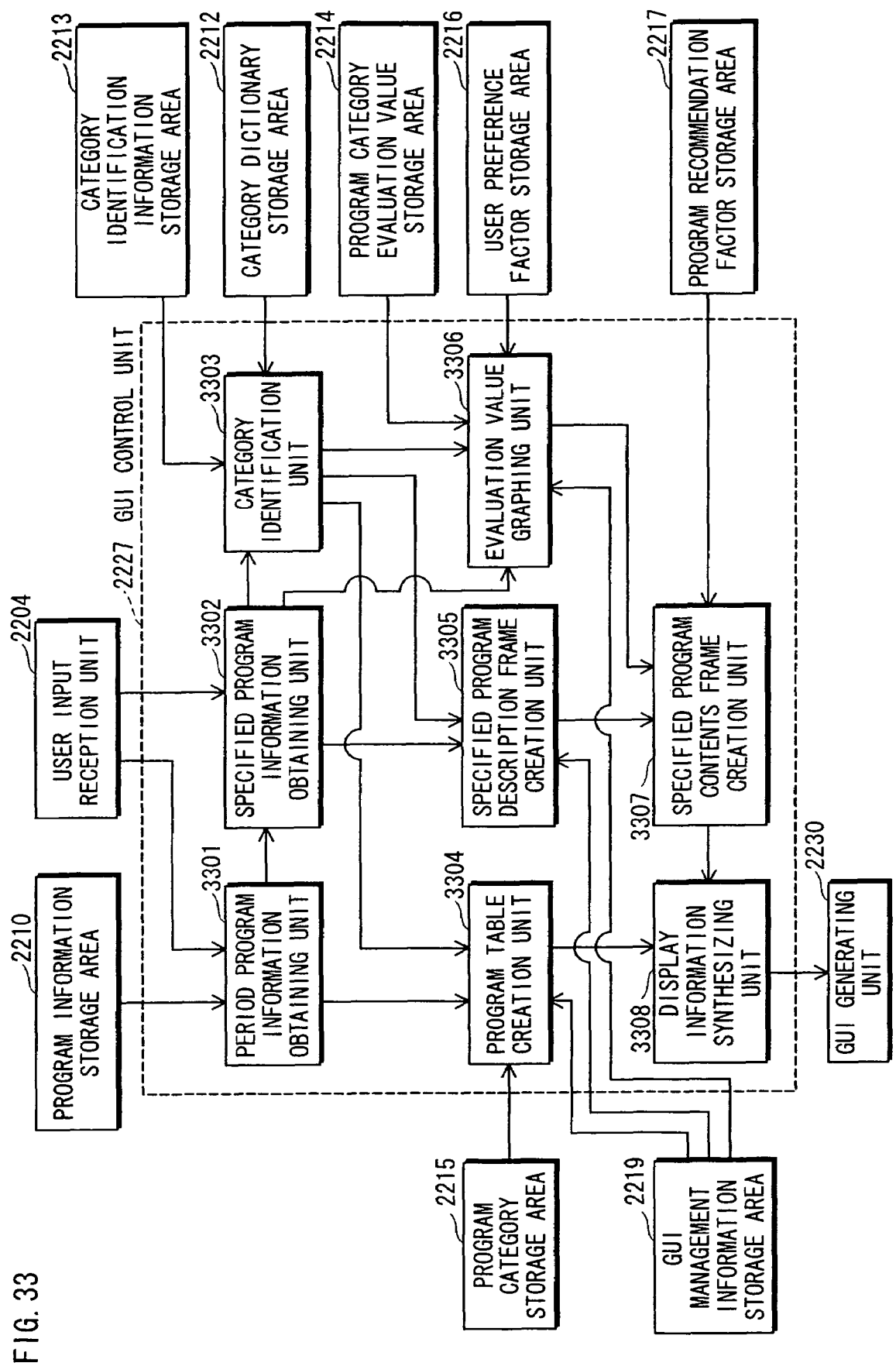
FIG. 33 is a structural diagram detailing the GUI control unit of the above-stated embodiment.

The GUI control unit 2227 is detailed below. FIG. 33 is a structural diagram showing details of the GUI control unit 2227.

The GUI control unit 2227 includes a period program information obtaining unit 3301, a specified program information obtaining unit 3302, a category identification unit 3303, a program table creation unit 3304, a specified program description frame creation unit 3305, an evaluation value graphing unit 3306, a specified program contents frame creation unit 3307, and a display information synthesizing unit 3308.

The period program information obtaining unit 3301, when receiving an instruction for displaying a program table from the user input unit 2204, obtains program information of a program broadcast during a predetermined period (e.g. two hours) including the current time, from the program information storage area 2210, and notifies the program table creation unit 3304 of the obtained program information. When the period program information obtaining unit 3301 receives notification of a specified program from the displayed program table from the user input reception unit 2204, it notifies the specified program information obtaining unit 3302 of program information of the specified program.

The specified program information obtaining unit 3302, upon receiving notification of the specified program from the user input reception unit 2204 and receiving notification of the program information of the specified program from the period program information obtaining unit 3301, notifies, of the program description of the specified program to be displayed in the program description column 2906, the specified program description frame creation unit 3305 and the category identification unit 3303. In addition, the specified program information obtaining unit 3302 notifies the evaluation value graphing unit 3306 of the title of the specified program.

The category identification unit 3303 extracts category identification information for each category from the category identification information storage area 2213, and notifies the program table creation unit 3304, the specified program description frame creation unit 3305, and the evaluation value graphing unit 3306 of the extracted category identification information. In addition, the category identification unit 3303 searches the category dictionaries stored in the category dictionary storage area 2212 for keywords included in the program information notified by the specified program information obtaining unit 3302. The category identification unit 3303 notifies the specified program description frame creation unit 3305 of a category gaining high contribution factor from each keyword.

The program table creation unit 3304 creates a program table using the template 2901 obtained from the GUI management information storage area 2219 and the program information notified by the period program information obtaining unit 3301. In this operation, the program table creation unit 3304 adds color to the program columns for the programs in accordance with the identification information notified by the category identification unit 3303. The program table creation unit 3304 also adds color to identification information 2903 of each category positioned above the display area 2904 of the program table according to the identification information 2903, and displays appropriate numbers to the date 2902 in the program table. The created program table is notified to the display information synthesizing unit 3308.

The specified program description frame creation unit 3305, upon receiving from the specified program information obtaining unit 3302 notification of program information of a specified program, reads the template 2901 from the GUI management information storage area 2219, and notifies the specified program contents frame creation unit 3307 of the program information and the program description column 2906 as well as notifying it of the color for the keywords included in the description of the program information.

The evaluation value graphing unit 3306, when receiving notification of category identification information from the category identification unit 3303 as well as receiving from the specified program information obtaining unit 3302 notification of a specified program title, reads the category evaluation value of the program corresponding to the specified program title, and reads, from the user preference factor storage area 2216, the user preference factor of the user that has specified the program title. Then the evaluation value graphing unit 3306 graphs the category evaluation value and the user preference factor in the radar graph 2907 of the template 2901 read from the GUI management information storage area 2219, and notifies the specified program contents frame creation unit 3307 of the completion of the above operations.

The specified program contents frame creation unit 3307 reads a recommendation factor of the specified program, from the program recommendation factor storage area 2217, and displays the recommendation factor 2905 by adding color to the stars according to the program's recommendation factor.

In addition, the specified program contents frame creation unit 3307 notifies the display information synthesizing unit 3308 of the program description column notified by the specified program description frame creation unit 3305 and the radar graph notified by the evaluation value graphing unit 3306.

The display information synthesizing unit 3308 synthesizes the program table created in the program table creation unit 3304, the radar graph notified by the specified program contents frame creation unit 3307, and the like, and notifies the GUI generating unit 2230 of the result of synthesizing.

Figure 34:
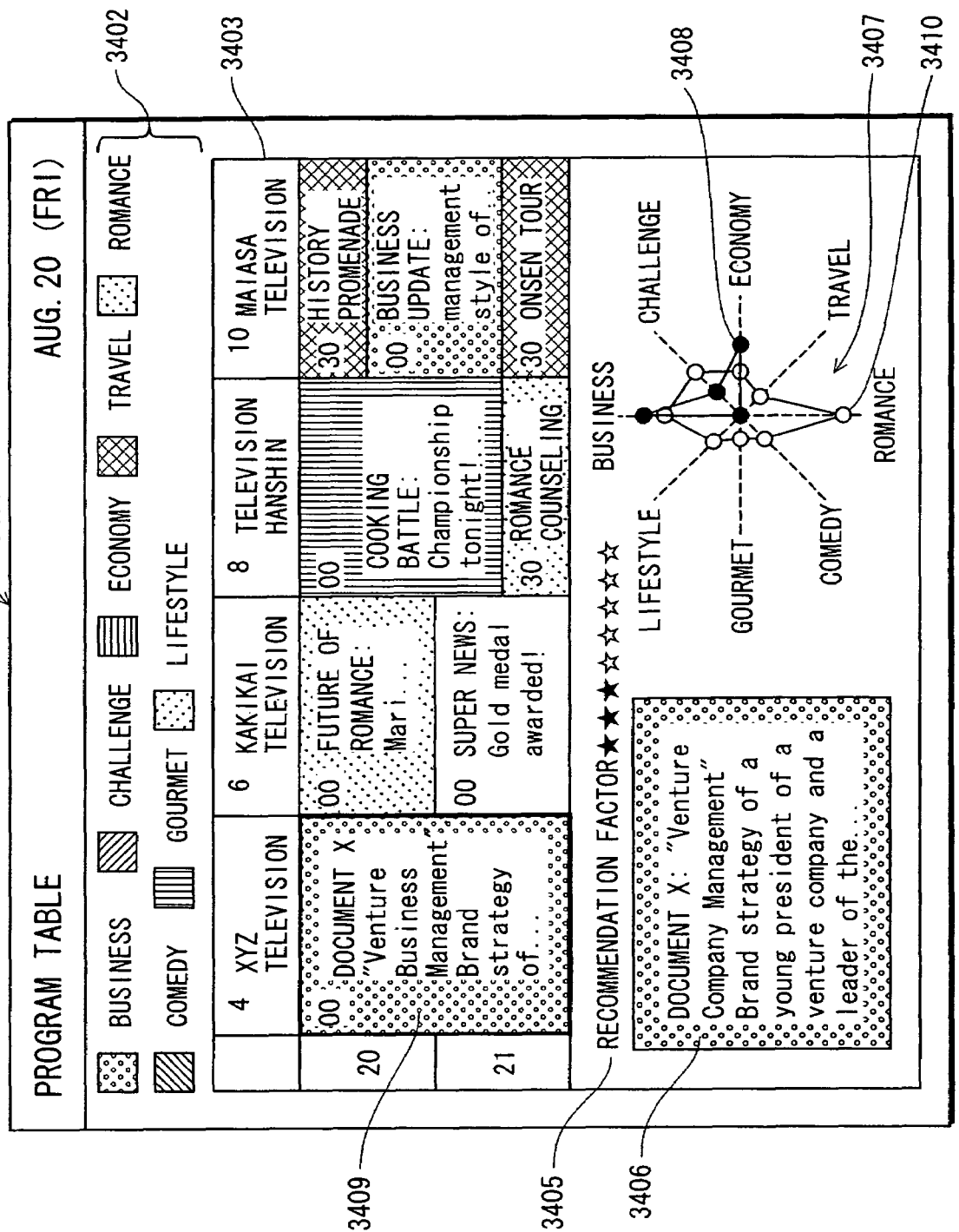
FIG. 34 is a diagram showing a display example of program table and recommendation factor of the above-stated embodiment, displayed by the GUI control unit.

The GUI generating unit 2230 generates a GUI screen as shown in FIG. 34. In the GUI screen 3401, oblique lines and the like are used to identify categories in the category identification information 3402 and the program table 3403. However, in the real screen, different colors as specified in the category identification information are used.

In the GUI screen 3401, the recommendation factor 3405, the program description column 3406, and the category evaluation value 3408 shown in black circle in the radar graph 3407 relate to the program 3409 in the program table 3403 that the user has specified.

In this program table 3403, each program is displayed by being classified into a category whose category evaluation value is the largest. When a user specifies a program, the number of stars whose color is changed is used to show the recommendation factor 3405 of the program. The user preference factor 3410 and the category evaluation value 3408 are shown in the radar graph, and the program description is displayed in the program description column 3406. By these displays, the user can easily judge whether to watch the program or not.

For example, if in the recommendation factor 3405, the number of stars whose color is changed is small, a user can specify another program for the sake of choosing a program that matches the user's preference factor.

Next, a display operation of the recommendation factor, being a main operation of the present embodiment, is described with use of the flowchart of FIG. 35.

First, the user input reception unit 2204 waits till receiving an instruction from a user to show a program table (S3502). Upon receiving the display instruction of a program table, the period program information obtaining unit 3301 obtains program information broadcast for a predetermined period (S3504).

The program table creation unit 3304 creates a program table according to the program information, and displays the program table on the television screen via the GUI generating unit 2230 (S3506).

Next, the user input reception unit 2204 wait still receiving from the user specification of one program out of the program table currently on display (S3508).

The evaluation value graphing unit 3306 obtains standardized category evaluation values for the specified program, from the program category evaluation value storage area 2214 (S3510), and obtains standardized user preference factor from the user preference factor storage area 2216 (S3514).

In the standardized category values, the category evaluation values for the categories are standardized so that the maximum value is "1.0", and the minimum value is "0.0". In the standardized user preference factor, the user preference factors for the categories are standardized so that the maximum value is "1.0" and the minimum value is "0.0".

The evaluation value graphing unit 3306 generates a radar graph (S3514), and displays the radar graph on the television screen via the GUI generating unit 2230.

The program recommendation factor calculation unit 2224 calculates a recommendation factor R using the equation (1), the category evaluation value and the user preference factor of the specified program, and stores the recommendation factor R in the program recommendation factor storage area 2217 (S3516).

The specified program contents frame creation unit 3307 reads the recommendation factor R for the specified program, from the program recommendation factor storage area 2217, rounds the number corresponding to the recommendation factor R to the nearest integer, changes the color of the stars for indicating the recommendation factor, in the number corresponding to the number of the integer, and displays the recommendation factor in the display screen via the GUI generating unit 2230 (S3518).

It is judged whether the user, having viewed the recommendation factor or the like of the specified program, has selected the specified program for watching (S3520). When it is judged that the specified program is selected, the processing ends. When it is judged that the specified program is not selected, the control returns to Step S3508.

Note that in the present embodiment, the program recommendation apparatus is for use by being connected to an external television or the like. However needless to say, the program recommendation apparatus may be for use by being assembled as an integral body with a television reception apparatus, a recording apparatus, and further with a set top box.

The program recommendation apparatus relating to the present invention calculates an evaluation value of a program that takes into account the importance of each keyword with respect to categories, and so is able to recommend a program that matches a user's preference with enhanced accuracy. Therefore, the program recommendation apparatus is applicable in an AV system, by either being connected to a recording apparatus and a television, or being assembled as an integral body with such recording apparatus and television.

The invention claimed is:

1. A program recommendation apparatus comprising:
   a program information storage unit configured to store therein program information of television programs;
   a category dictionary containing words included in the program information as keywords, where each of the keywords is stored in association with contribution factors assigned to respective categories, the television programs being classified into the categories;
   an evaluation value calculation unit configured to, for each of the television programs, a) search program information of the television program for the keywords contained in said category dictionary, b) for any found keywords, obtain category summations of contribution factors of the found keywords for each of the categories, and c) calculate category evaluation values of the television program according to the category summations of the contribution factors;
   a user-preference-factor storage unit configured to store therein user preference factors, each user preference factor indicating a user's preference toward a corresponding category and being shown in numerical form corresponding to the category evaluation values;
   a recommending unit configured to calculate, using a predetermined equation, a recommendation factor that is a degree of similarity between the category evaluation values of the television programs and the user preference factors, and recommend one or more television programs to the user according to the calculated recommendation factor;
   a history storing unit configured to store therein a history of television programs the user has watched or recorded in the past;
   a category evaluation value storage unit configured to store therein the category evaluation values of the television programs calculated by said evaluation value calculation unit; and
   a user-preference-factor analysis unit configured to, for the television programs included in the history, a) obtain corresponding category evaluation values from said category evaluation value storage unit, b) obtain category summations of the corresponding category evaluation values, c) set the user preference factors as the category summations of the corresponding category evaluation values respectively, in relation to a summation of the corresponding category evaluation values across the categories, and d) store the user preference factors in said user-preference-factor storage unit,
   said recommending unit comprises:
   a recommendation factor calculation subunit configured to calculate the recommendation factor for a corresponding one of the television programs, by a) calculating, with respect to each of the categories, a difference of a corresponding category evaluation value and a corresponding user preference factor, b) summing the calculated differences across the categories, c) subtracting the summation of the differences from a total number of the categories, and d) setting a value obtained by the subtraction as the recommendation factor; and
   a recommended program determining subunit configured to determine, as the recommended programs, television programs having high recommendation factors calculated in said recommendation factor calculation subunit.

2. A program recommendation method used in a program recommendation apparatus that has a category dictionary containing words included in program information of television programs as keywords, where each of the keywords is stored in association with contribution factors assigned to respective categories, the television programs being classified into the categories, the program recommendation method comprising:
   a program information recording step of recording the program information of the television programs;
   a category dictionary storing step for storing words included in the program information as keywords, where each of the keywords is stored in association with contribution factors assigned to respective categories, the television programs being classified into the categories;
   an evaluation value calculation step of, for each of the television programs, a) searching program information of the television program for the keywords contained in the category dictionary, b) for any found keywords, obtaining category summations of contribution factors of the found keywords for each of the categories, and c) calculating category evaluation values of the television program according to the category summations of the contribution factors;
   a user-preference-factor recording step of recording user preference factors, each user preference factor indicating a user's preference toward a corresponding category and being shown in numerical form corresponding to the category evaluation values; and
   a recommending step of calculating, using a predetermined equation, a recommendation factor that is a degree of similarity between the category evaluation values of the programs and the user preference factors, and recommending one or more television programs to the user according to the calculated recommendation factor;
   a history storing step of storing a history of television programs the user has watched or recorded in the past;
   a category evaluation value storing step of storing the category evaluation values of the television programs calculated by said evaluation value calculation step; and
   a user-preference-factor analysis step, for the television programs included in the history, a) obtaining corresponding category evaluation values from said category evaluation value storage step, b) obtaining category summations of the corresponding category evaluation values, c) setting the user preference factors as the category summations of the corresponding category evaluation values respectively, in relation to a summation of the corresponding category evaluation values across the categories, and d) storing the user preference factors, said recommending step comprises:

a recommendation factor calculation step of calculating the recommendation factor for a corresponding one of the television programs, by a) calculating, with respect to each of the categories, a difference of a corresponding category evaluation value and a corresponding user preference factor, b) summing the calculated differences across the categories, c) subtracting the summation of the differences from a total number of the categories, and d) setting a value obtained by the subtraction as the recommendation factor; and a recommended program determining step of determining, as the recommended programs, television programs having high recommendation factors calculated in said recommendation factor calculation step.

3. A program stored on a computer-readable storage medium for making a program recommendation apparatus that has a category dictionary containing words included in program information of television programs as keywords, where each of the keywords is stored in association with contribution factors assigned to respective categories, the television programs being classified into the categories, to perform the steps comprising:

a program information recording step of recording the program information of the television programs;

a category dictionary storing step for storing words included in the program information as keywords, where each of the keywords is stored in association with contribution factors assigned to respective categories, the television programs being classified into the categories;

an evaluation value calculation step of, for each of the television programs, a) searching program information of the television program for the keywords contained in the category dictionary, b) for any found keywords, obtaining category summations of contribution factors of the found keywords for each of the categories, and c) calculating category evaluation values of the television program according to the category summations of the contribution factors;

a user-preference-factor recording step of recording user preference factors, each user preference factor indicating a user's preference toward a corresponding category and being shown in numerical form corresponding to the category evaluation values; and a recommending step of calculating, using a predetermined equation, a recommendation factor that is a degree of similarity between the category evaluation values of the television programs and the user preference factors, and recommending one or more television programs to the user according to the calculated recommendation factor;

a history storing step of storing a history of television programs the user has watched or recorded in the past;

a category evaluation value storing step of storing the category evaluation values of the television programs calculated by said evaluation value calculation step; and a user-preference-factor analysis step, for the television programs included in the history, a) obtaining corresponding category evaluation values from said category evaluation value storage step, b) obtaining category summations of the corresponding category evaluation values, c) setting the user preference factors as the category summations of the corresponding category evaluation values respectively, in relation to a summation of the corresponding category evaluation values across the categories, and d) storing the user preference factors, said recommending step comprises:

a recommendation factor calculation step of calculating the recommendation factor for a corresponding one of the television programs, by a) calculating, with respect to each of the categories, a difference of a corresponding category evaluation value and a corresponding user preference factor, b) summing the calculated differences across the categories, c) subtracting the summation of the differences from a total number of the categories, and d) setting a value obtained by the subtraction as the recommendation factor; and a recommended program determining step of determining, as the recommended programs, television programs having high recommendation factors calculated in said recommendation factor calculation step.

* * * * *